(12) United States Patent
Thramann et al.

(10) Patent No.: US 10,666,188 B2
(45) Date of Patent: May 26, 2020

(54) METHODS FOR LOADING BATTERY STORAGE COMPARTMENTS INTO A SOLAR CANOPY SUPPORT STRUCTURE

(71) Applicant: LT 350, LLC, Longmont, CO (US)

(72) Inventors: Jeffrey Thramann, Longmont, CO (US); Terence Davidovits, Longmont, CO (US); Steve Cook, Longmont, CO (US); John Slattebo, Longmont, CO (US); Walter Fallows, III, Longmont, CO (US)

(73) Assignee: LT 350, LLC, Longmont, CO (US)

( * ) Notice: Subject to any disclaimer, the term of this patent is extended or adjusted under 35 U.S.C. 154(b) by 0 days.

(21) Appl. No.: 16/118,679

(22) Filed: Aug. 31, 2018

(65) Prior Publication Data

US 2019/0103830 A1  Apr. 4, 2019

Related U.S. Application Data

(63) Continuation of application No. 15/007,140, filed on Jan. 26, 2016, now Pat. No. 10,069,456, which is a
(Continued)

(51) Int. Cl.
*H02S 20/24* (2014.01)
*F24S 25/40* (2018.01)
(Continued)

(52) U.S. Cl.
CPC ............. *H02S 20/24* (2014.12); *E04H 6/06* (2013.01); *F24S 25/10* (2018.05); *F24S 25/40* (2018.05); *H02S 20/10* (2014.12); *H02S 20/23* (2014.12); *H02S 40/38* (2014.12); *E04H 6/025* (2013.01); *F24S 2025/014* (2018.05); *Y02B 10/12* (2013.01); *Y02E 10/47* (2013.01)

(58) Field of Classification Search
CPC .......... H02S 20/24; H02S 20/23; H02S 20/10; H02S 40/38; F24S 25/40; F24S 25/10; F24S 2025/014; E04H 6/06; E04H 6/025; Y02B 10/12; Y02E 10/47
USPC ........................................................ 320/101
See application file for complete search history.

(56) References Cited

U.S. PATENT DOCUMENTS 3,744,195 A * 7/1973 Ferkich ............... E04B 1/34315
52/63
4,560,916 A * 12/1985 Yoshiyuki ................ H02J 7/14
320/138
(Continued)

*Primary Examiner* — M Baye Diao
(74) *Attorney, Agent, or Firm* — Perkins Coie LLP

(57) ABSTRACT

The present application provides methods for loading and unloading high capacity storage equipment to a solar power canopy. The methods and structures may include horizontal support members have mechanisms to engage corresponding mechanisms on a compartment housing the high capacity storage equipment. The mechanisms may include plates, flanged surfaces, rails, tracks, hook assemblies, and ridges. The methods and structures may include a superstructure that is coupled to an moves with respect to the solar power canopy frame. The superstructure may pivot and/or rotate to allow loading and unloading. The methods and structures also may include cabinets or cubicles sized to receive one or more compartments housing the high capacity storage equipment.

16 Claims, 42 Drawing Sheets

Related U.S. Application Data continuation-in-part of application No. 14/678,476, filed on Apr. 3, 2015, now Pat. No. 9,647,300, which is a continuation-in-part of application No. PCT/US2014/058671, filed on Oct. 1, 2014.

(60) Provisional application No. 61/885,897, filed on Oct. 2, 2013.

(51) Int. Cl.
| | |
|---|---|
| *F24S 25/10* | (2018.01) |
| *H02S 40/38* | (2014.01) |
| *H02S 20/23* | (2014.01) |
| *H02S 20/10* | (2014.01) |
| *E04H 6/06* | (2006.01) |
| *F24S 25/00* | (2018.01) |
| *E04H 6/02* | (2006.01) |

(56) References Cited

U.S. PATENT DOCUMENTS

| | | | | |
|---|---|---|---|---|
| 5,644,207 A * | 7/1997 | Lew | ............ | B60K 1/04 |
| | | | | 320/101 |
| 5,857,477 A * | 1/1999 | James | ............ | B60J 11/00 |
| | | | | 135/88.01 |
| 6,803,746 B2 * | 10/2004 | Aker | ............ | H02J 7/0042 |
| | | | | 320/139 |
| 7,850,391 B2 * | 12/2010 | Omar | ............ | E01F 13/12 |
| | | | | 256/13.1 |
| 8,313,224 B2 * | 11/2012 | Moyer | ............ | F21S 8/02 |
| | | | | 362/1 |
| 9,121,189 B2 * | 9/2015 | Hixson | ............ | E04H 1/1211 |
| 9,275,391 B2 * | 3/2016 | Thramann | ............ | G06Q 30/00 |
| 10,055,706 B2 * | 8/2018 | Thramann | ............ | H02J 7/35 |

* cited by examiner

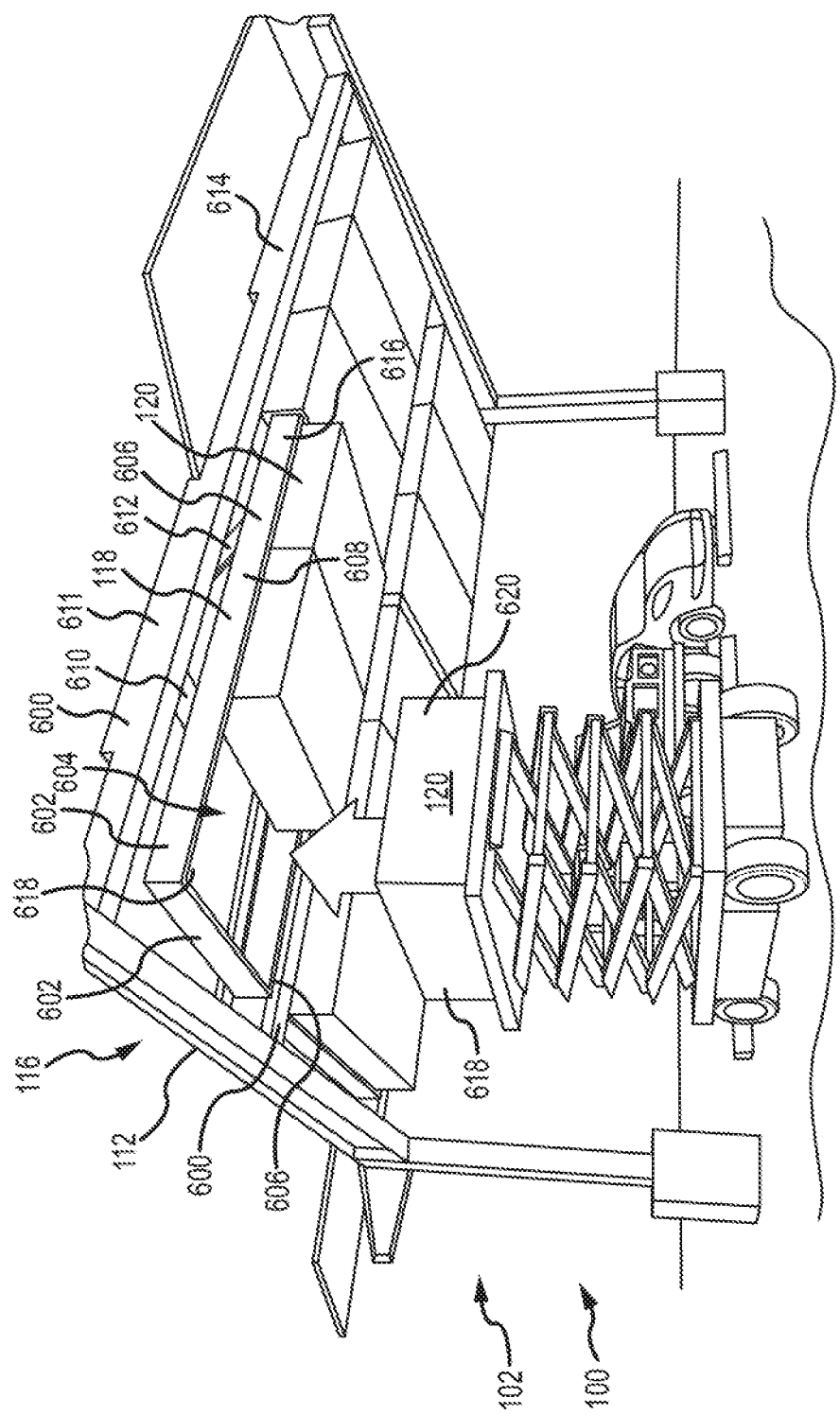

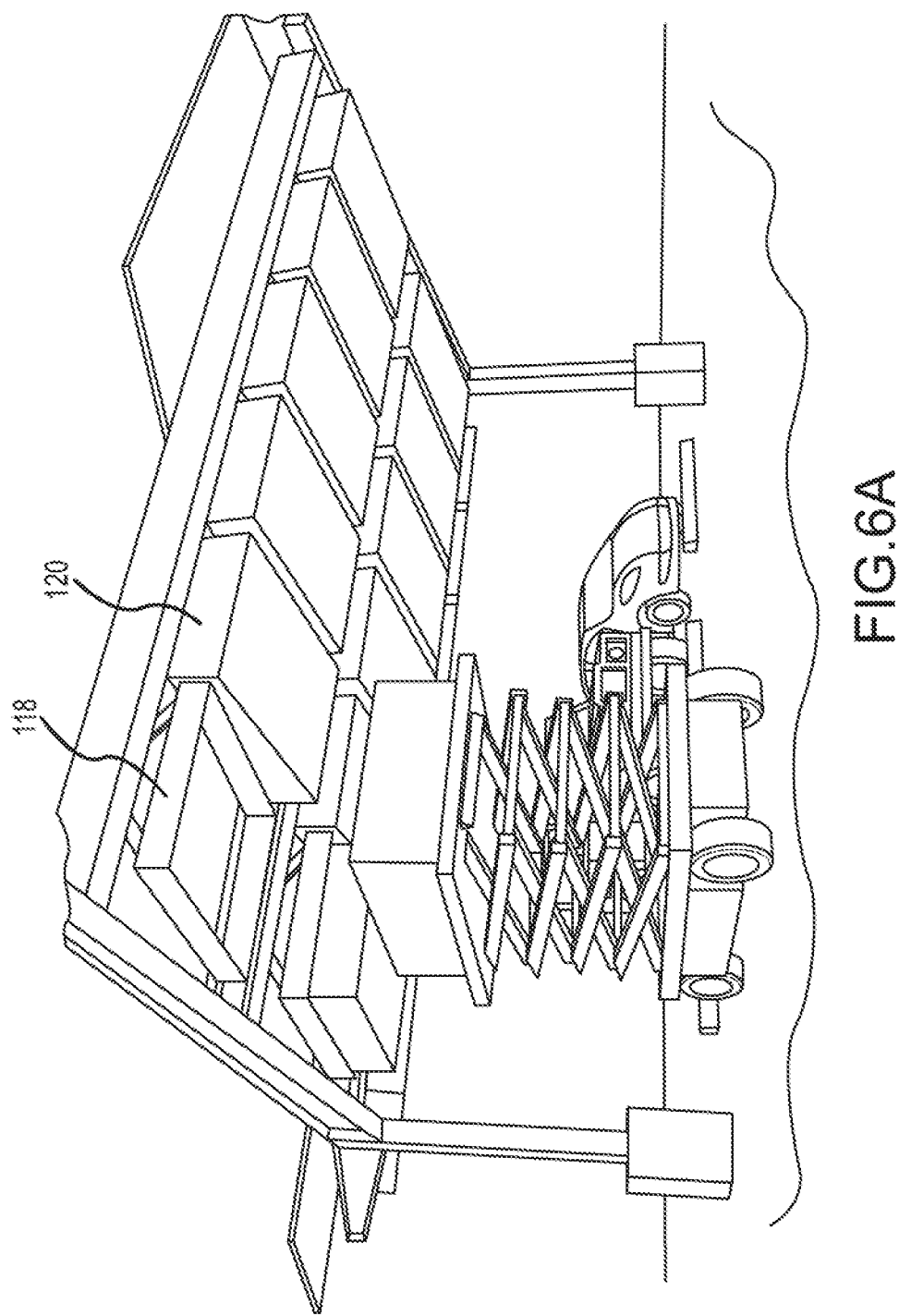

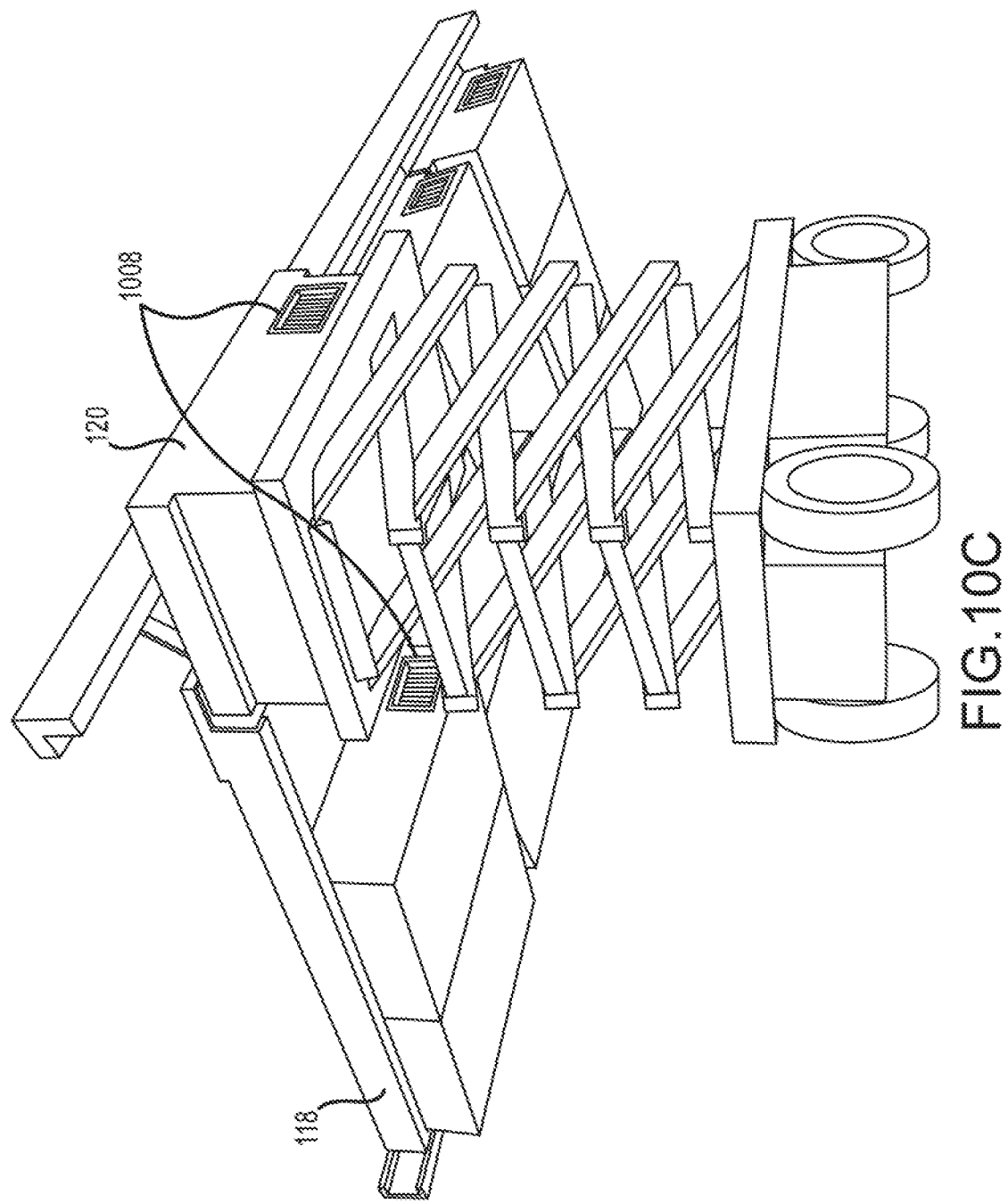

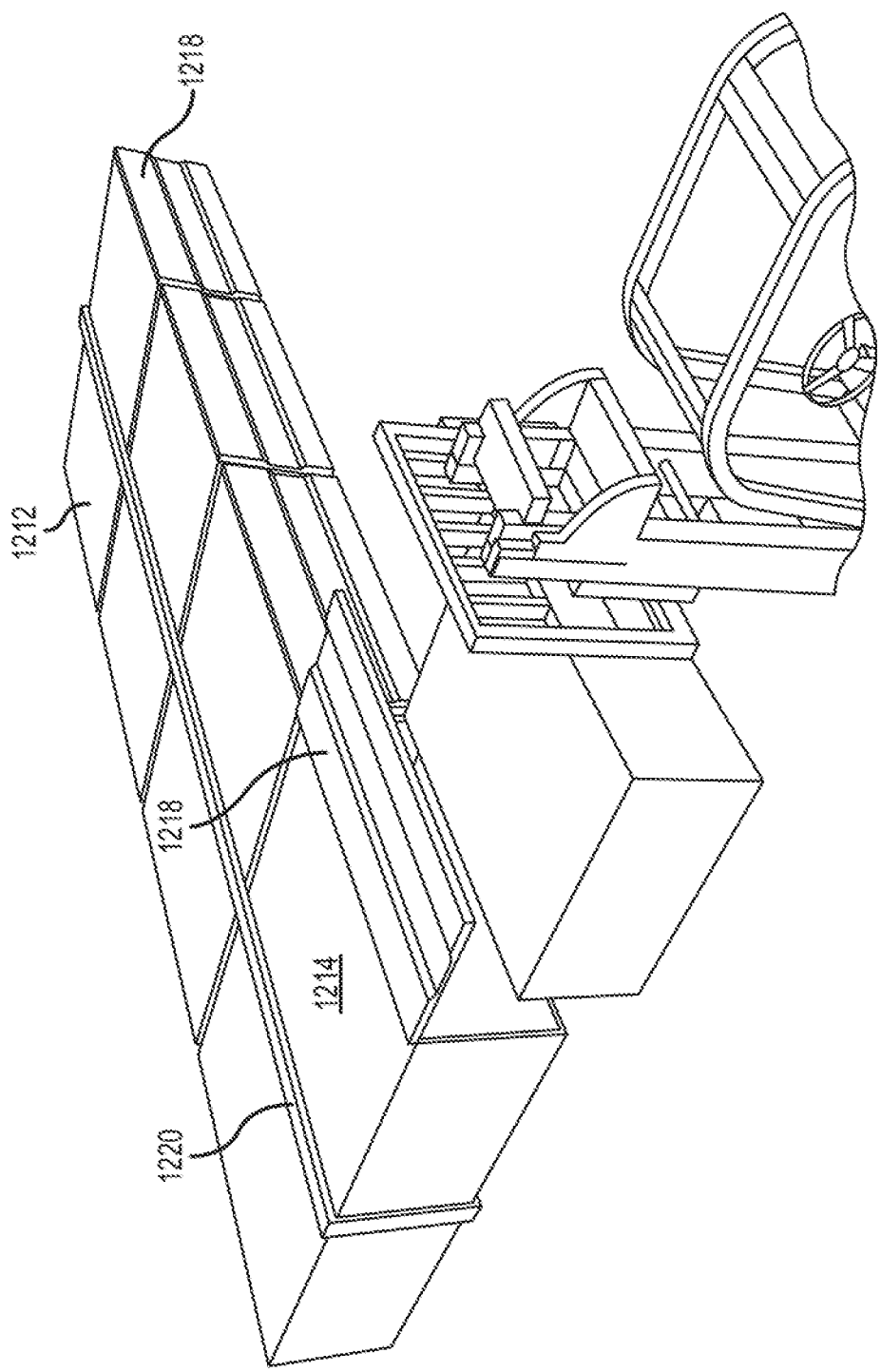

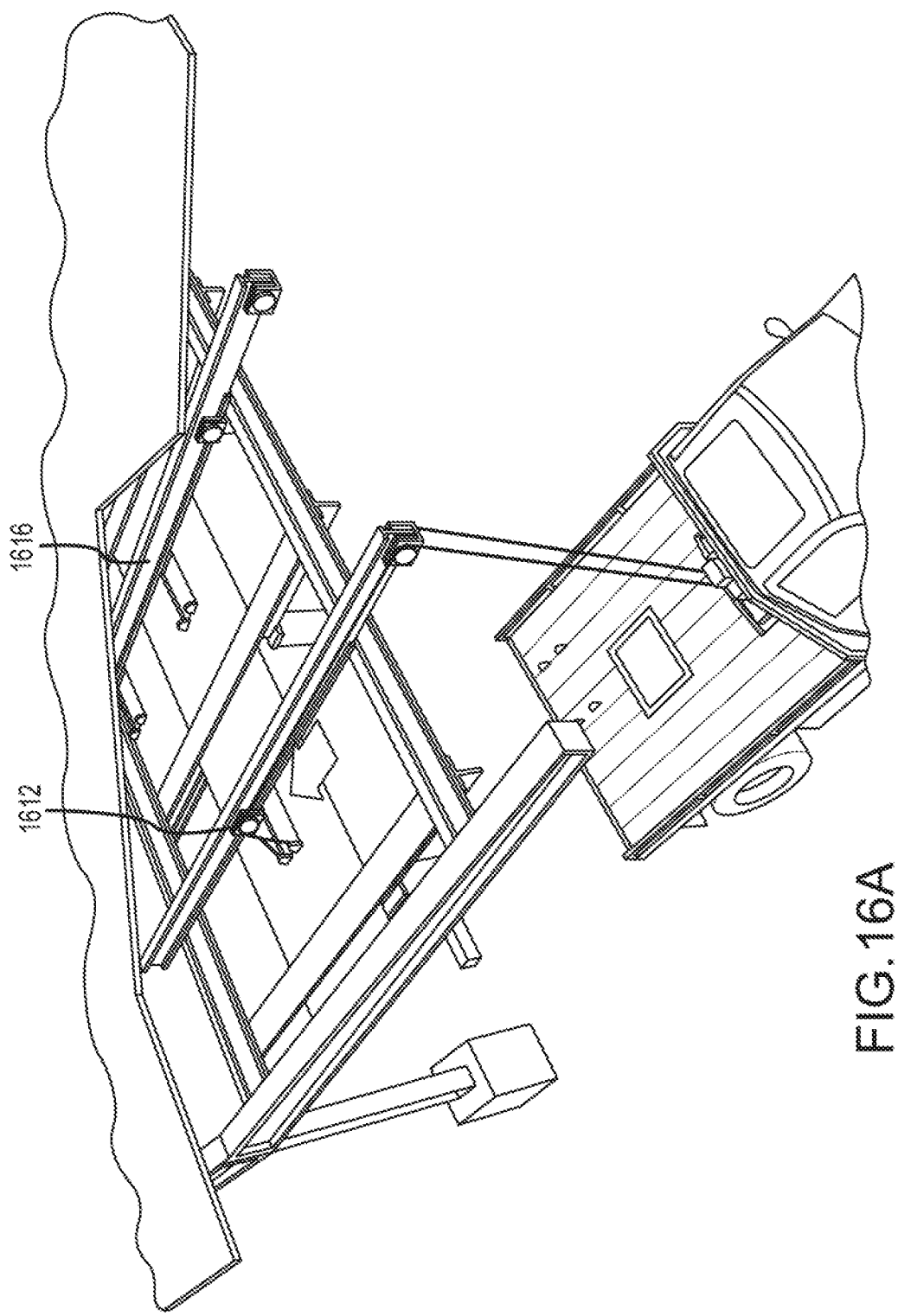

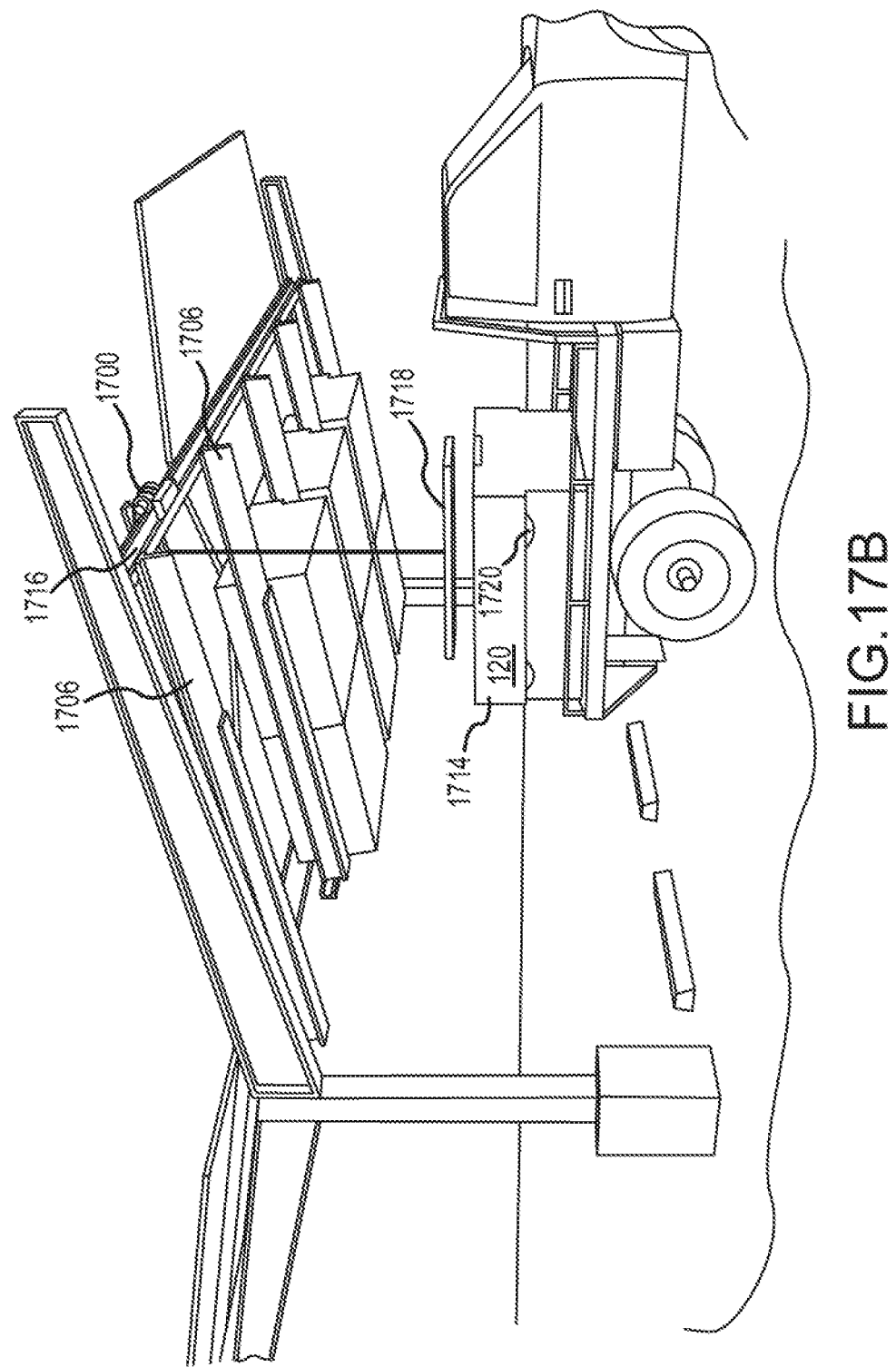

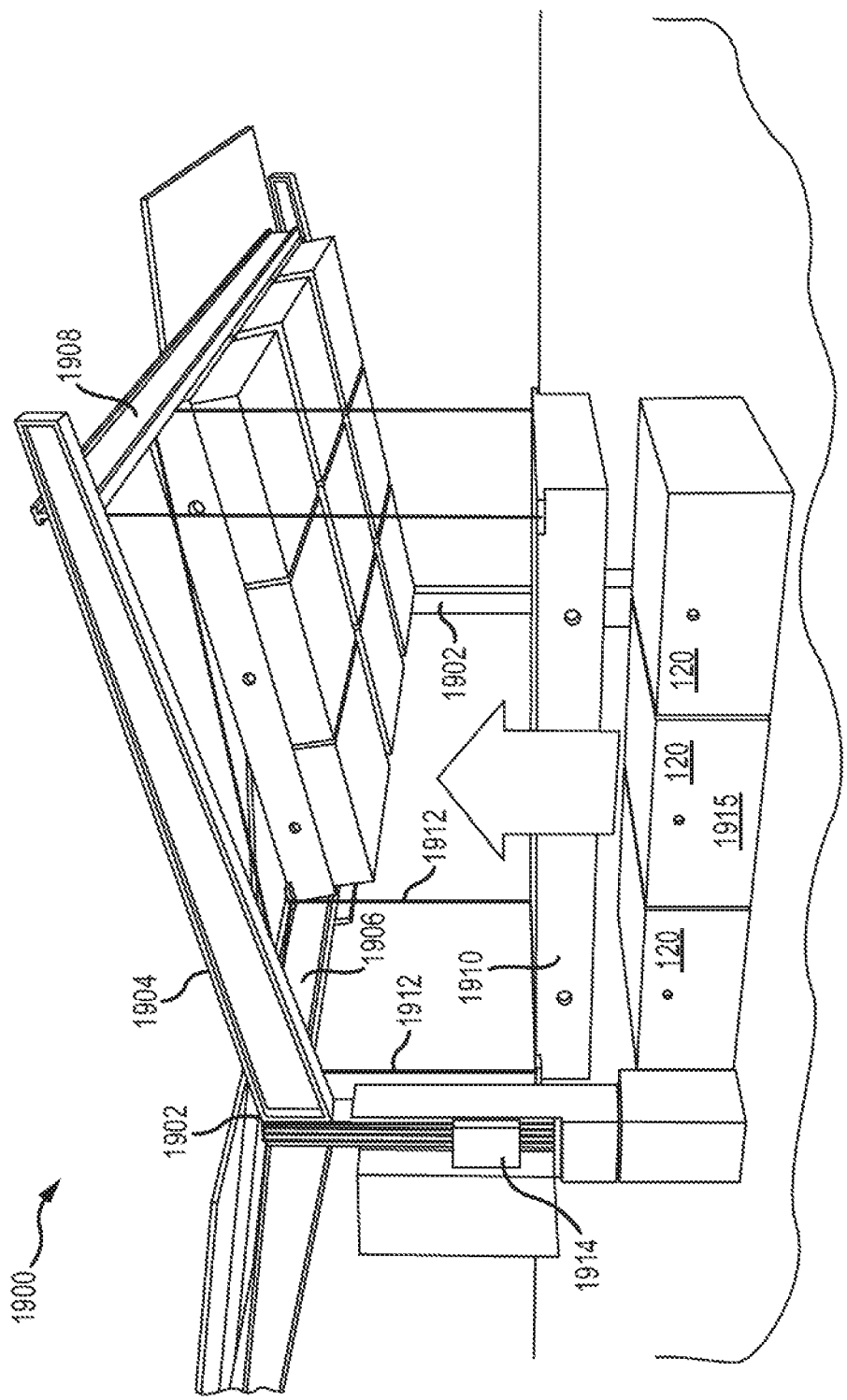

METHODS FOR LOADING BATTERY STORAGE COMPARTMENTS INTO A SOLAR CANOPY SUPPORT STRUCTURE

CROSS-REFERENCE TO RELATED PATENT APPLICATIONS

The present application claims is a continuation in part of U.S. patent application Ser. No. 14/678,476, filed Apr. 3, 2015, titled SOLAR CANOPY WITH INTEGRAL STORAGE COMPARTMENT TO RECEIVE HIGH CAPACITY BATTERIES, which is a continuation in part application of International Application Serial Number PCT/US14/58671, filed Oct. 1, 2014, which claims priority to U.S. Provisional Patent Application Ser. No. 61/885,897, filed Oct. 2, 2013, the disclosures of which are all incorporated herein by reference as if set out in full.

BACKGROUND

As countries become more concerned with oil reserves and renewable energy, carbon footprints become a focus of attention. Grid power and/or local power networks attempt to address some of the concerns with renewable energy sources. However, renewable energy sources are inherently unpredictable in their output. Additionally, large scale renewable energy farms, such as wind turbine farms and large solar arrays, are traditionally coupled to the grid power network remote from any particular residential or commercial center. Thus, problems with the traditional or conventional power grid disrupts the renewable energy power source in a manner similar to the disruption of any power. For example, a natural disaster would potentially disrupt both hydrocarbon generated power as well as renewable power.

As identified in the above, one of the problems with traditional renewable energy sources relates to the consistency of the power source to provide a particular amount of power or energy, typically measured in kilowatt/Hrs. The patent applications, incorporated above by reference, introduce a unique canopy that combines renewable energy generation, relatively large scale power storage, and a controllable discharge to a grid or local power network with a portable or modular design.

As can be appreciated, the compartments (whether a single compartment or multiple compartments) that hold the batteries, the inverter(s), power control module(s), coolant systems, and other components can become cumbersome and heavy. One of the features of the applications referenced above is the modular nature of the compartments allowing for battery storage compartments to be replaced or swapped out. The process of loading/unloading battery storage compartments can be difficult.

Thus, against the above background, improved methods are provided for loading and unloading battery storage compartments into a canopy structure.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a method of loading and unloading relatively heavy and unwieldly components, such as a battery compartment, onto a solar power canopy is provided. In one configuration, the solar power canopy includes a superstructure that is pivotally coupled to the solar power canopy frame. The superstructure pivots from an engaged configuration to a load/unload configuration because one end of the superstructure is pivotally connected to the solar power canopy frame and the other end is movably coupled by a scissor linkage assembly or the like. The scissor linkage could be replaced by a cable linkage, for example. The load/unload configuration lowers the superstructure such that the top of the superstructure, which is generally open in this aspect, is exposed. The components may be moved into or out of the superstructure as necessary through the exposed top into the cavity defined by the superstructure. For loading, once positioned, such as by sliding or the like, the component is coupled to the superstructure and the superstructure is pivoted back to the engaged configuration. For unloading, the component is un-coupled form the superstructure and removed. Once removed, a different component may be loaded or the superstructure can be pivoted back to the engaged configuration.

In another configuration, the superstructure is pivoted to a horizontal position. A lift is used to move the battery compartment into and out of the superstructure. The battery compartment may couple or decouple from the superstructure using a coupling. The connection between the compartment and the solar power canopy may include a socket in pin arrangement in certain aspects. In other aspects the connection may be a bolt and flange connection.

In one configuration, the superstructure is first pivoted from the engaged position to a first non-engaged position, similar to as described above. The superstructure is next rotated to a vertical arrangement or a second non-engaged position, which allows for loading and/or unloading of the components. The second non-engaged position may be considered the load/unload configuration in this aspect of the technology.

In another aspect, the superstructure may be provided with rails or tracks. The battery component would be lifted to align extension surfaces or flanged surfaces on the battery compartment with the rails or tracks such that the component may slide along the rails or tracks. The battery compartment may be provided with rollers or wheels to facilitate the movement.

In yet another embodiment, the solar power canopy may be provided with one or more beams or members designed to support the heavy compartments, such as the battery compartments, specific inverter compartments, PC control compartments, transformer compartments, energy storage compartments, or the like. The battery compartments are moved horizontally to engage or disengage the beams or members and coupled or decoupled as required. The battery compartments may be pre-designed with power and data interfaces that blind mate with power and data interfaces in the beams or members or plugged using a male and female plug and socket. In certain aspects, the beams may be configured to have cabinets to receive the battery compartments. The cabinets or cubicle arrangement may be provided with a lip or stop to prevent or inhibit over inserting the battery compartment.

In certain aspects, the solar power canopy may be provided with ridges on beams, members, panels, connection plates, or the like. The battery compartments similarly would be provided with mating ridges on surfaces. The battery compartments may be aligned such that the corresponding ridges engage to hold the battery compartment in place. In certain aspects, panels may be provided that can be moved into and out of an open or closed position to facilitate the placement of the battery compartment in the solar power canopy. In one aspect of the technology, to load a battery compartment, a panel having a ridge is placed in an open position. The battery compartment is moved, vertically and/or horizontally, into the superstructure until a first ridge on the battery compartment aligns with a first ridge on the solar power canopy. The panel is next moved to the closed position, which correspondingly aligns a second ridge on the battery compartment with a ridge on the panel (or the second ridge on the solar power canopy). The lift mechanism would lower the battery compartment until the first and second ridges couple. The battery compartment may be further secured with bolts or the like.

In another configuration, the technology of the present application provides a cabinet that has a cubicle consistent with the above. The cubicle is pivotally coupled to the solar power canopy. The cubicle is pivoted from an engaged position to a load/unload position. The battery compartment is slid into the cubicle or cabinet from a lift mechanism or the like and fastened thereto.

The technology of the present application also provides for mechanisms to facilitate lifting and moving the battery compartments, frames, and superstructures. In one exemplary aspect, a winch or windlass is provided with cable attachments to a battery compartment. The cable is routed to a window or location where the battery compartment is loaded/unloaded. The cable is coupled to the battery compartment and the winch, windlass, or the like is used to hoist or lower the battery compartment. The cable may be routed through a joint or track for the cable to provide positioning. In certain embodiments, the cable may be coupled to a pulley system. In certain aspect, the pulley and/or winch may be movable along tracks to position to the mechanism to allow lifting of the battery compartment. In still other aspects, the superstructure may be raised and/or lowered onto the battery compartment and coupled/de-coupled from the solar power canopy to facilitate loading and unloading. The winch or windlass may further be used to pivot the superstructures using a cable and pulley system.

In certain aspects, the solar power canopy may have a plurality of solar panel arrays coupled to the solar power canopy. The solar panel arrays may be supported using a counterbalanced guidewire. In certain aspects, the solar panel arrays may be coupled to an axle or hinged to the solar power canopy such that the solar panel arrays may be pivoted in unison or separately by moving the guidewire or axle such that the solar panel arrays are positionable for more optimal sun exposure.

The solar power canopy may further have a support member to allow the battery compartments to be snap fit onto the support member using a male protrusion/female socket configuration.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 6 shows an alternative configuration of the solar power canopy with a plurality of battery compartments and a superstructure consistent with the technology of the present application.

FIG. 6A shows an alternative configuration of the solar power canopy of FIG. 6.

FIG. 10C is another view of connecting a battery compartment to a solar power canopy as shown in FIGS. 10, 10A, and 10B.

FIG. 12C shows a configuration of the solar power canopy of FIG. 12B consistent with the technology of the present application.

FIG. 16A shows additional detail of the solar power canopy of FIG. 16.

FIG. 17B shows an alternative configuration of the solar power canopy with a plurality of battery compartments of FIGS. 17 and 17A.

FIG. 19 shows a solar power canopy with a plurality of battery compartments consistent with the technology of the present application.

FIGS. 21, 21A, 21B, 21C, and 21D show a solar power canopy with a plurality of battery compartments consistent with the technology of the present application.

Figure 22:
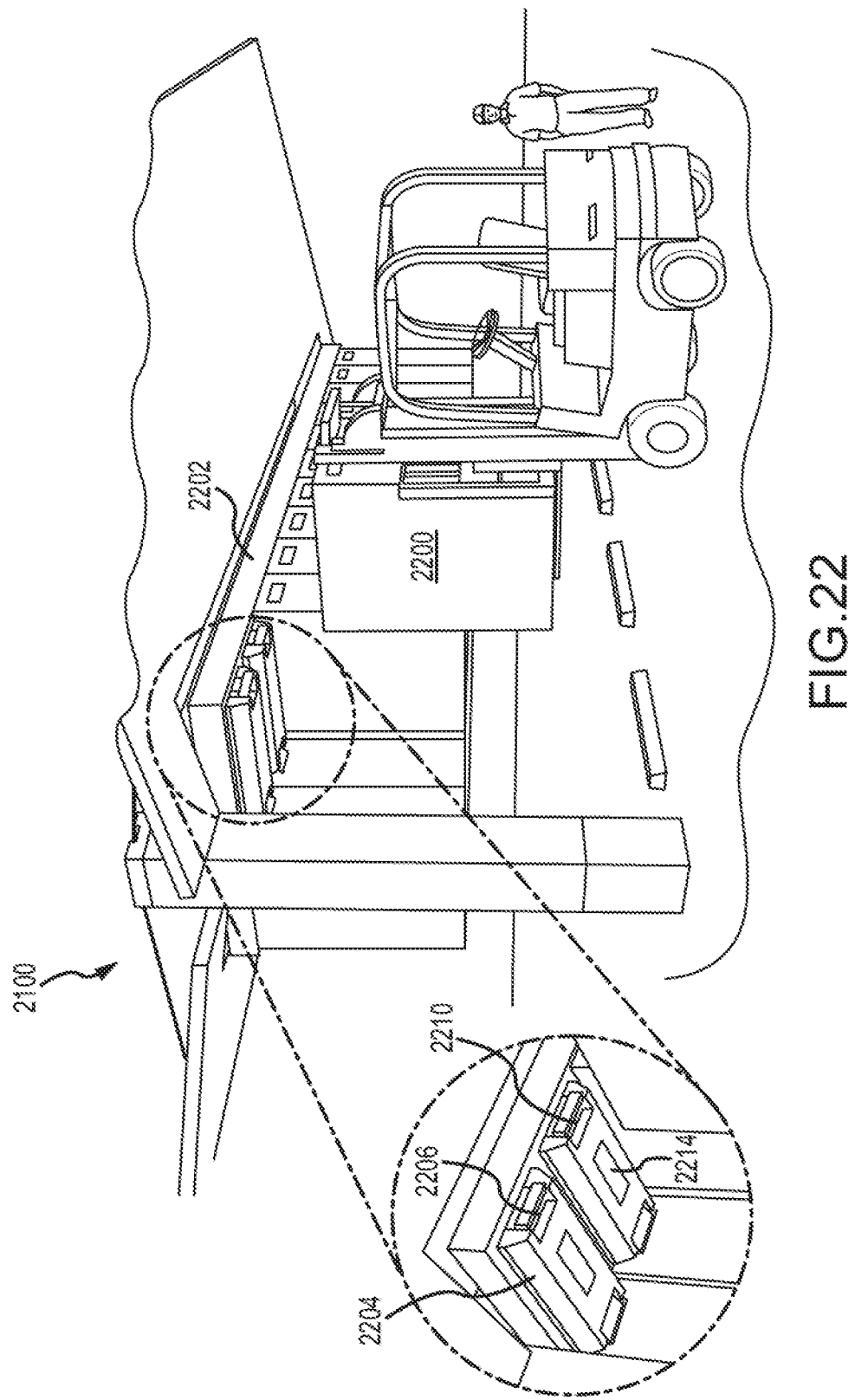
Figure 22A:
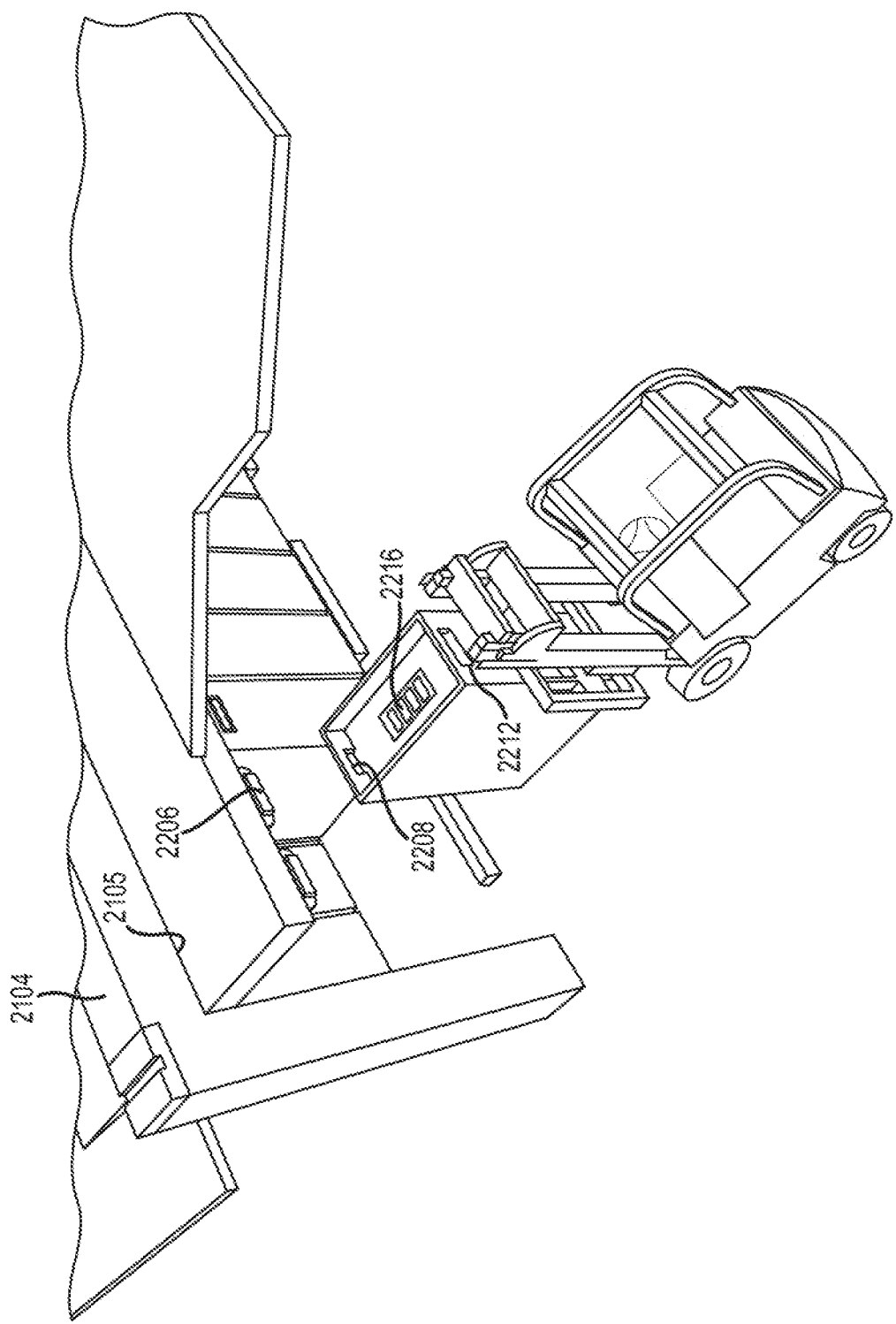

FIGS. 22 and 22A show a solar power canopy with a plurality of battery compartments consistent with the technology of the present application.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to solar canopies having one or more photoelectric cells. However, the technology described herein may be used for other renewable energy sources, and the like. For example, the technology of the present application may be applicable to heliostats, wind energy generation stations, or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
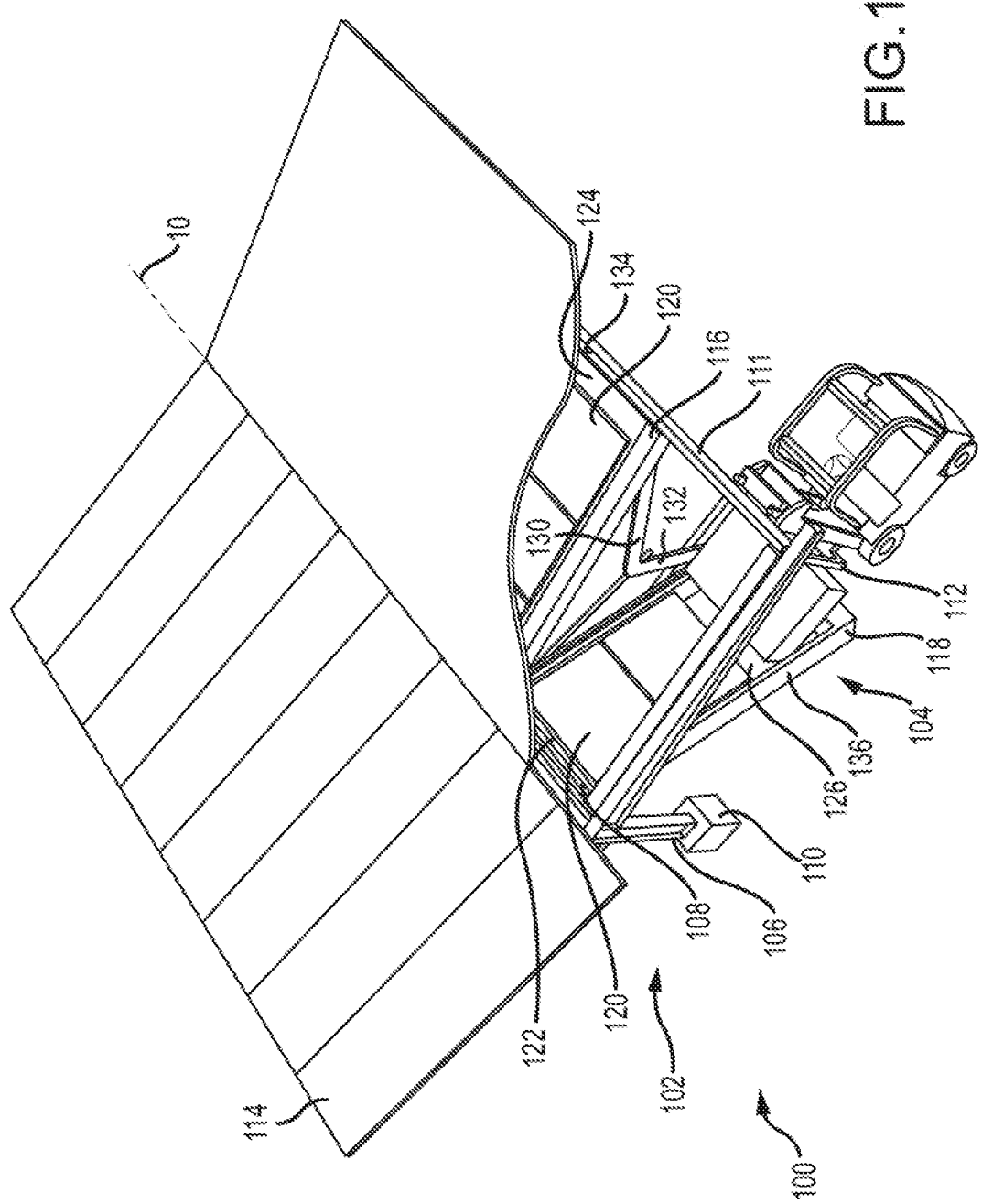
FIG. 1 shows a perspective view of a solar power canopy with a plurality of battery storage compartments consistent with the technology of the present application.

With reference now to FIG. 1, a solar power canopy 100 is provided. Solar power canopy 100 includes a solar canopy 102 and a battery system 104. The solar canopy 102 includes a frame structure 106 comprising, in this exemplary embodiment, a generally vertical center support strut 108 anchored to the ground via a concrete coupling 110 and a plurality of generally horizontally extending struts 112. The struts 112, in this exemplary embodiment, angle upwards from the center support strut 108 forming a shallow Y shape for the solar canopy 102. Other shapes are possible including a T-shape, a 7-shape, or the like. The outer edges of the struts 112 are typically coupled by a support member 111.

Extending generally outward from a center axis 10 and supported by the horizontally extending struts 112 are a plurality of solar panels 114, a portion of which are cut away for clarity. Arranged below the plurality of solar panels 114, and supported, in part, by the center support strut 108 and the horizontally extending struts 112 is a battery compartment support frame 116, which may be considered part of the battery system 104 for the purposes of the present application, although battery system 104 and solar canopy 102 form an integrated unit.

In this exemplary rendition, the battery compartment support frame 116 comprises a box like superstructure 118 into which the battery compartment 120 can be loaded. As shown, each box like superstructure that is designed to hold a predetermined number of battery compartments 120, which can be 1, 2, 3 (as shown) or more battery compartments 120. The box like superstructure 118 is pivotally connected at a first end 122 proximal the center strut 108 to the battery compartment support frame 116. The second end 124, opposite the first end 122 and distal the center strut 108, is pivotally coupled to an expandable linkage assembly 126. The expandable linkage assembly 126 also is pivotally coupled to the horizontally extending struts 112 and/or the battery compartments support frame 116 proximal the outer member 111.

The linkage assembly 126 has a first member 130 pivotally coupled to a second member 132 such that the linkage assembly expands and collapses in a scissor motion. This allows the box like superstructure 118 to move from a closed configuration 134 to an opened configuration 136 (the assembly may have intermediate stops as well). In the open configuration 136, as can be appreciated, battery compartments 120 can be loaded/unloaded from the box like superstructure 118. In the closed configuration 134, the solar power canopy 100 can be used as a conventional parking structure or the like.

Figure 2:
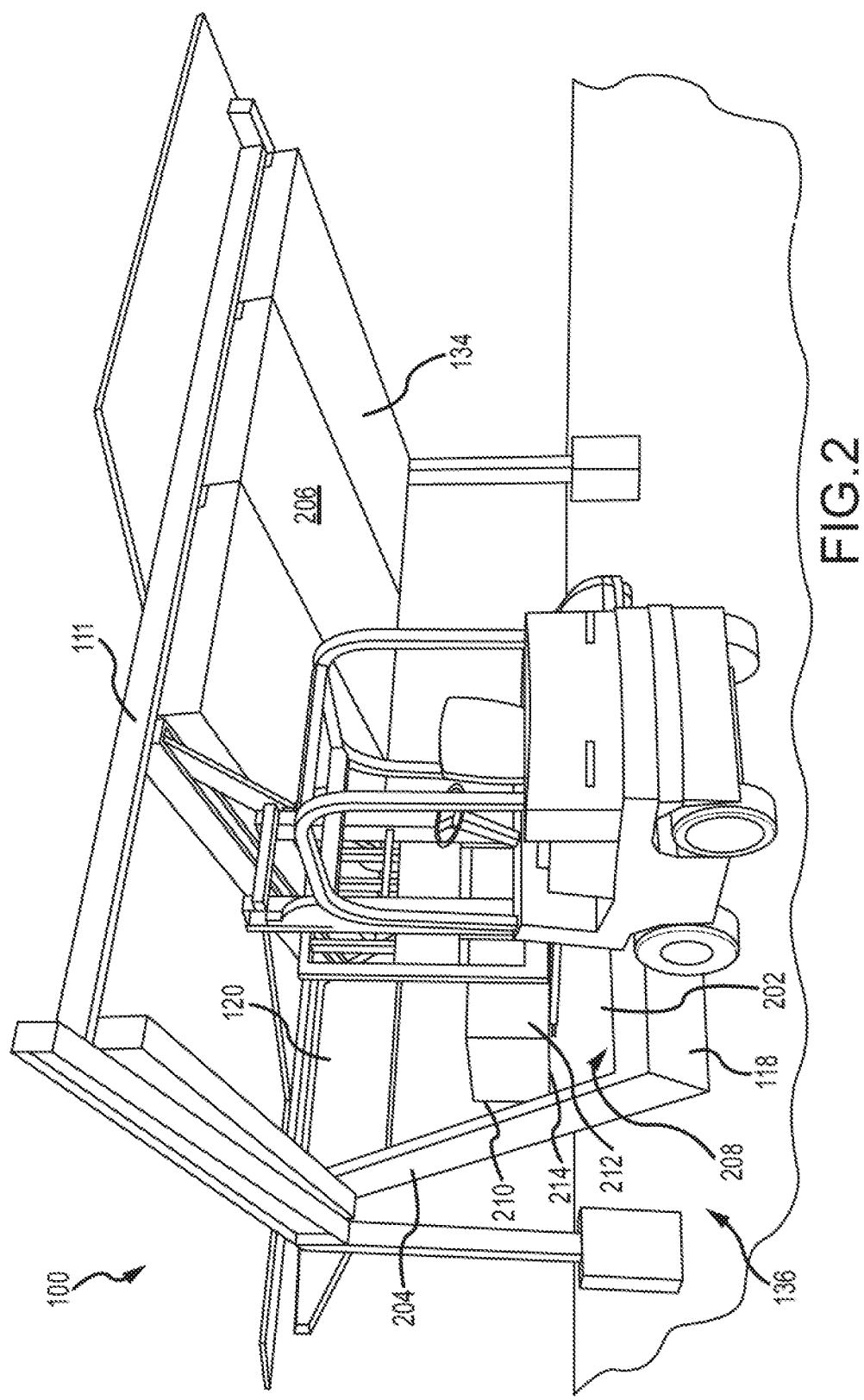
FIG. 2 shows another perspective view of the solar power canopy of FIG. 1.

With reference to FIG. 2, the solar power canopy 100 is shown with one of the box like superstructures 118 in the open configuration 136. As can be appreciated, the box like superstructure 118 is provided with an open top 202, a plurality of side walls 204, and a bottom 206 to define a volume or cavity 208 into which one or more battery compartments 120 can be fitted, of which three are shown in one box like superstructure 118. The solar power canopy 100 is provided, in this exemplary embodiment, with four box like superstructures 118. The superstructure 118 is opened by pivotally moving the superstructure such that the linkage assembly 126 extends.

In this case, the battery compartment 120 is moved generally horizontally into a space in the cavity 208. The leading edge 210 of the battery compartment 120 is fitted into the cavity 208 and pivotally engaged therein. The trailing edge 212 is lowered until the base 214 of the battery compartment 120 is flush against the bottom 206 of the superstructure 118. In some embodiments, the battery compartment 120 can be located along the superstructure 118 by sliding it from a lower/higher position to a higher/lower position to fit the battery compartment into the superstructure 118. Removal of one or more of the battery compartments 120 would be completed by reverse order of the above. Once the battery compartments 120 are loaded, unloaded, or a combination thereof, the superstructure is pivoted to the closed (or engaged) configuration 134. The superstructure would be latched or locked to inhibit inadvertent opening of the superstructure.

Figure 3:
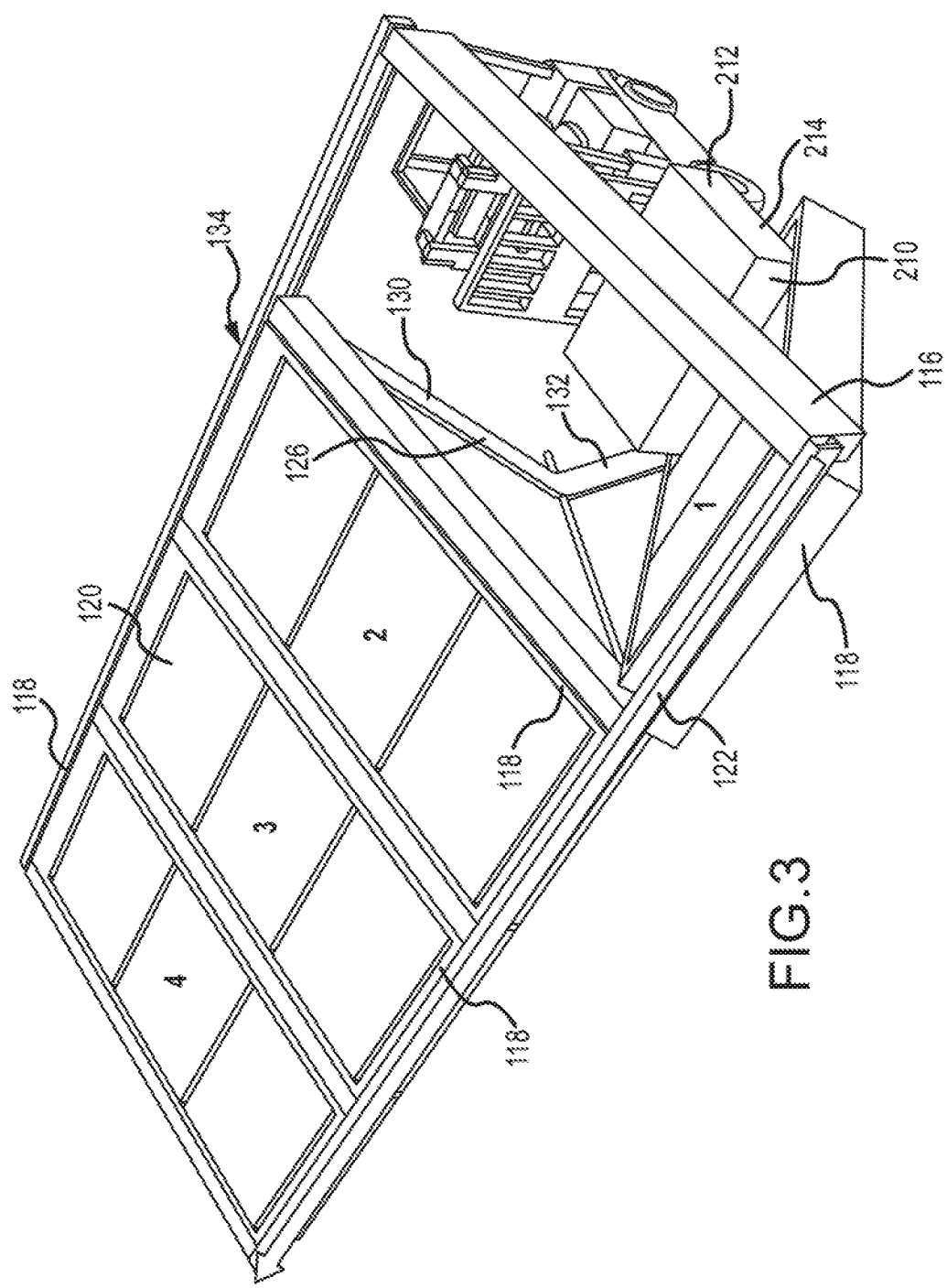
FIG. 3 shows another perspective view of the solar power canopy of FIG. 1.
Figure 4:
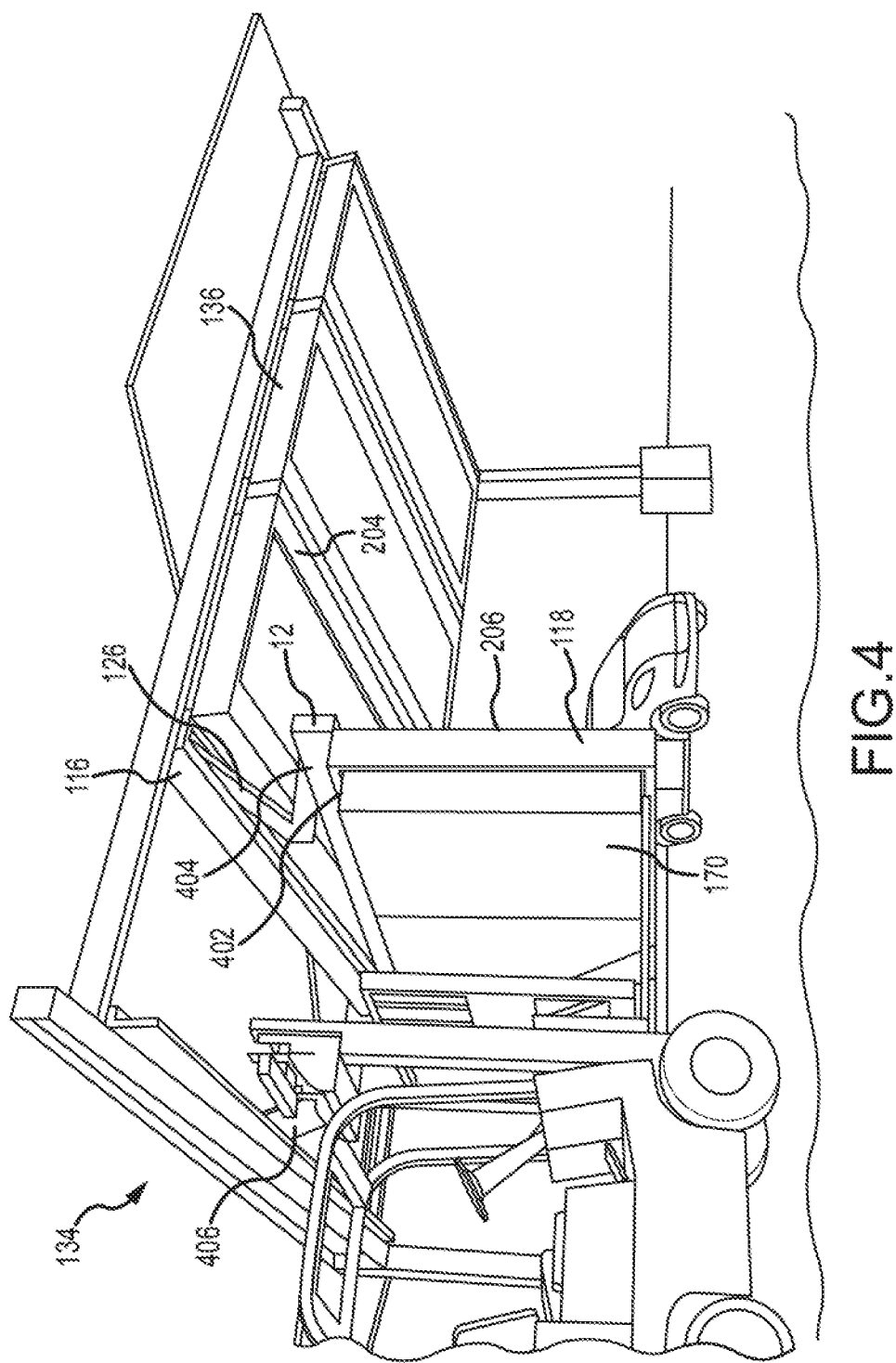
FIG. 4 shows an alternative configuration of the solar power canopy of FIG. 1 consistent with the technology of the present application.

With reference to FIG. 4, a similar methodology for loading and unloading battery compartments 120 to the superstructure 118 is provided. In this case, the superstructure is pivotally coupled to the battery support frame 116 to allow at least two separate pivots. As described in part above, the superstructure is first moved from a closed (or engaged) position 134 to an open (or load) position 136 by pivoting the superstructure 118 at a pivot point proximal the central axis 10. The distal end of the superstructure is moved downward a distance as defined by the linkage assembly 126. The pivoting, in this case, is limited to arrange the superstructure in a generally horizontal position (as opposed to the angled position shown in FIG. 3). A sidewall 204 of the superstructure comprises an inner wall portion 402 hingedly coupled to an outerwall portion 404 to allow the superstructure to pivot about a transverse axis 12. The superstructure pivots about the transverse axis 12 until the bottom 206 is generally arranged in a vertical position or perpendicular to the ground (or support surface). The superstructure 118 may have a tether 406 to inhibit over rotation of the superstructure 118. The battery compartment 120 would subsequently be horizontally moved into or out of the superstructure 118. Once the battery compartments 120 are manipulated, the superstructure is pivoted from the vertical arrangement back to the horizontal arrangement, which corresponds to the open (load) configuration 134. The superstructure is next pivoted about axis 10 by causing the linkage 126 to scissor to the closed (or engaged) configuration 136.

Figure 5:
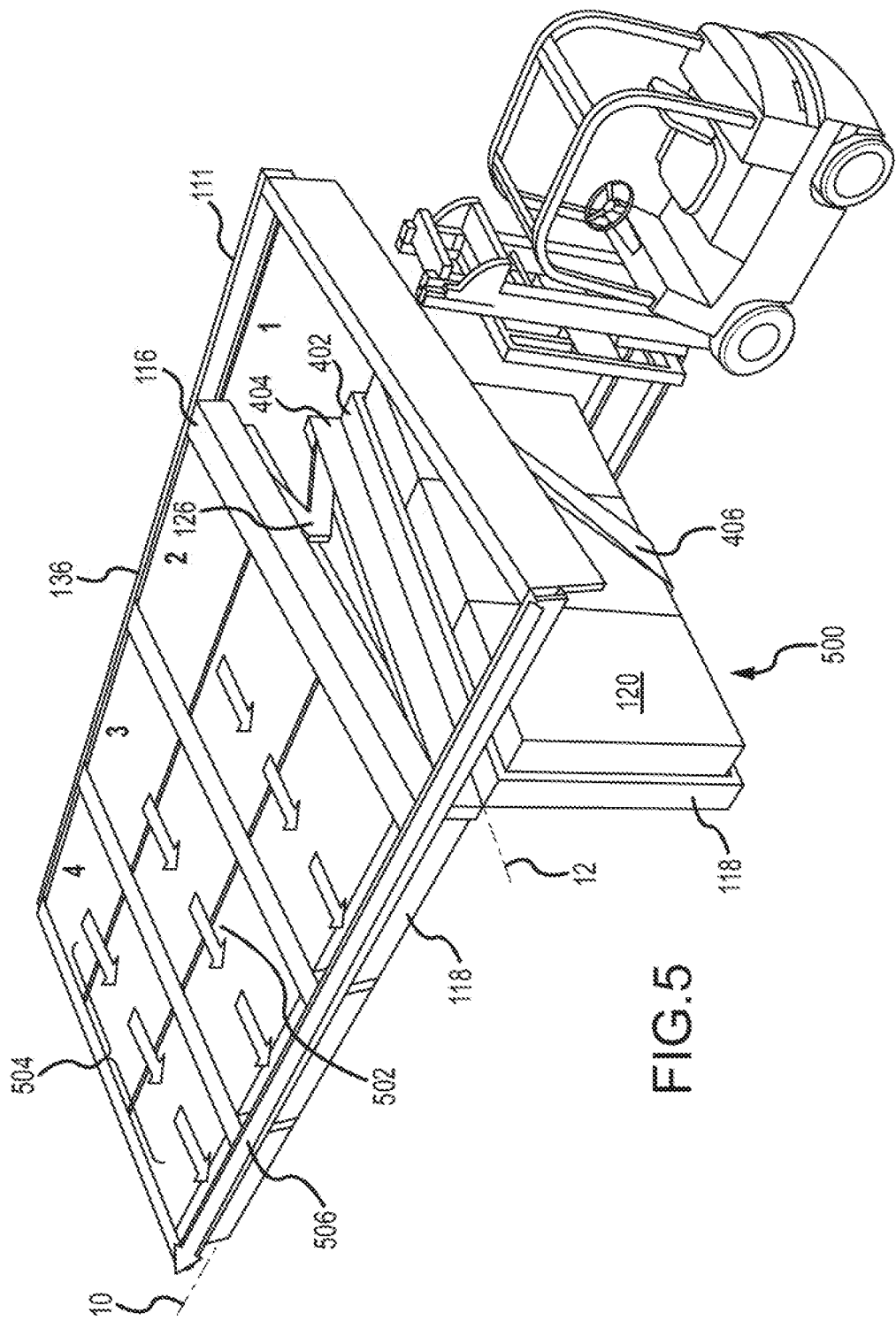
FIG. 5 shows another perspective view of the solar power canopy of FIG. 4.

FIG. 5 shows another view of the embodiment described in FIG. 4 with the linkage assembly 126 extended and one of the superstructures $118_1$ in the vertical configuration 500 and the remaining superstructure $118_{2-4}$ in the closed (or engaged) configuration 136. As shown, the battery compartments may each be interconnected electrically via connectors 502 and each battery bank 504 may be electrically interconnected to a bus 506, such as a bus bar or the like.

Figure 7:
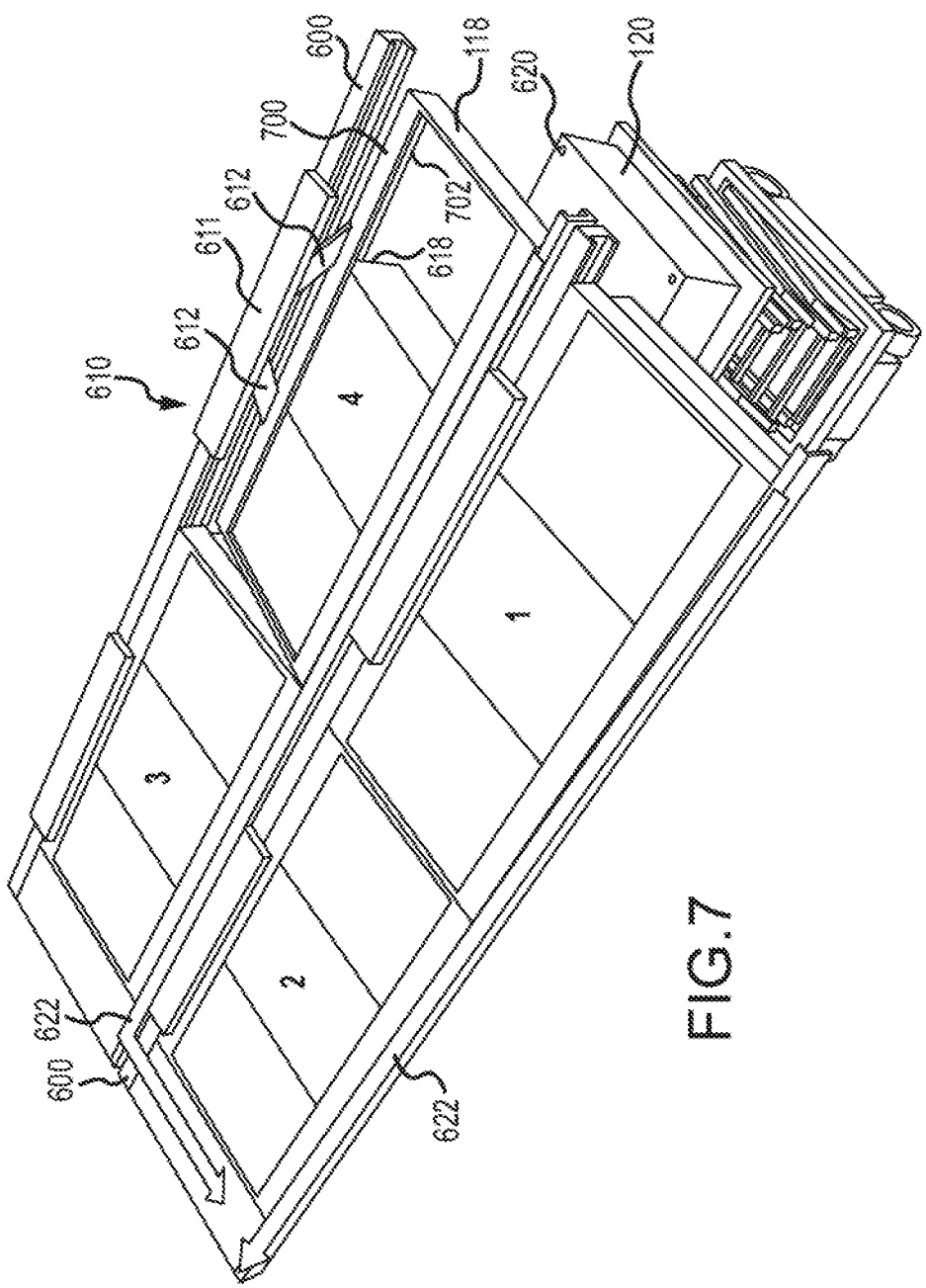
FIG. 7 shows another perspective view of the solar power canopy of FIG. 6.

With reference now to FIG. 6, the solar power canopy 100 is shown in an alternative configuration. The solar power canopy 100 includes the battery compartment support frame 116 that has a box like superstructure 118. The battery compartment support frame 116, in this exemplary embodiment, includes a plurality of support members 600 that are coupled to the horizontal struts 112 of solar canopy 102. The superstructure 118 includes a plurality of sidewalls 602 that define a volume 604 into which one or more battery compartments 120 may be placed. While not shown, the superstructure 118 may have internal walls to separate each battery. Also, the superstructure may have a cover (similar to the bottom 206 described above). The superstructure 118 is pivotally coupled to one of the support members 600 by a hinge or the like at a first end 606. The second end 608 opposite the first end 606 is coupled to a linkage assembly 610 (which may simply be a lever arm in certain embodiments). The linkage assembly 610, as shown, has two members 612 pivotally coupled at a pivot 611 to one of the support members 600 such that the superstructure may be moved between a closed (or engaged) configuration 614 and an open (or load) configuration 616. In the open (or load) configuration 616, the superstructure 118 is generally horizontal to the ground or support surface. A plurality of first connectors 618 are coupled to the sidewalls 602 (or cover if provided). The battery compartment 120 is moved horizontally, vertically until a corresponding plurality of second connectors 620 engage the first connectors 618. The first and second connectors 618, 620 could be pin and socket connectors, bolts and nuts, mating flanges, or the like. FIG. 6A is similar to the FIG. 6 configuration but each battery compartment 120 is provided a separate superstructure 118. FIG. 7 shows another view of the configuration in FIG. 6. As can be appreciated, the linkage 610 couple be a scissor type of linkage. In certain embodiments, the linkage 610 may be independent lever arms 612, where each lever arm 612 would each have its own pivot. FIG. 7 also shows a potential bus connection 622 connecting the batteries. As best seen in FIG. 7, the superstructure 118 has an upper portion 700 that has a flared, flanged, or extended surface 702 forming a shoulder to which the first connectors 618 may be coupled. Extended surface 702 may be formed into a cover as desired.

Figure 8:
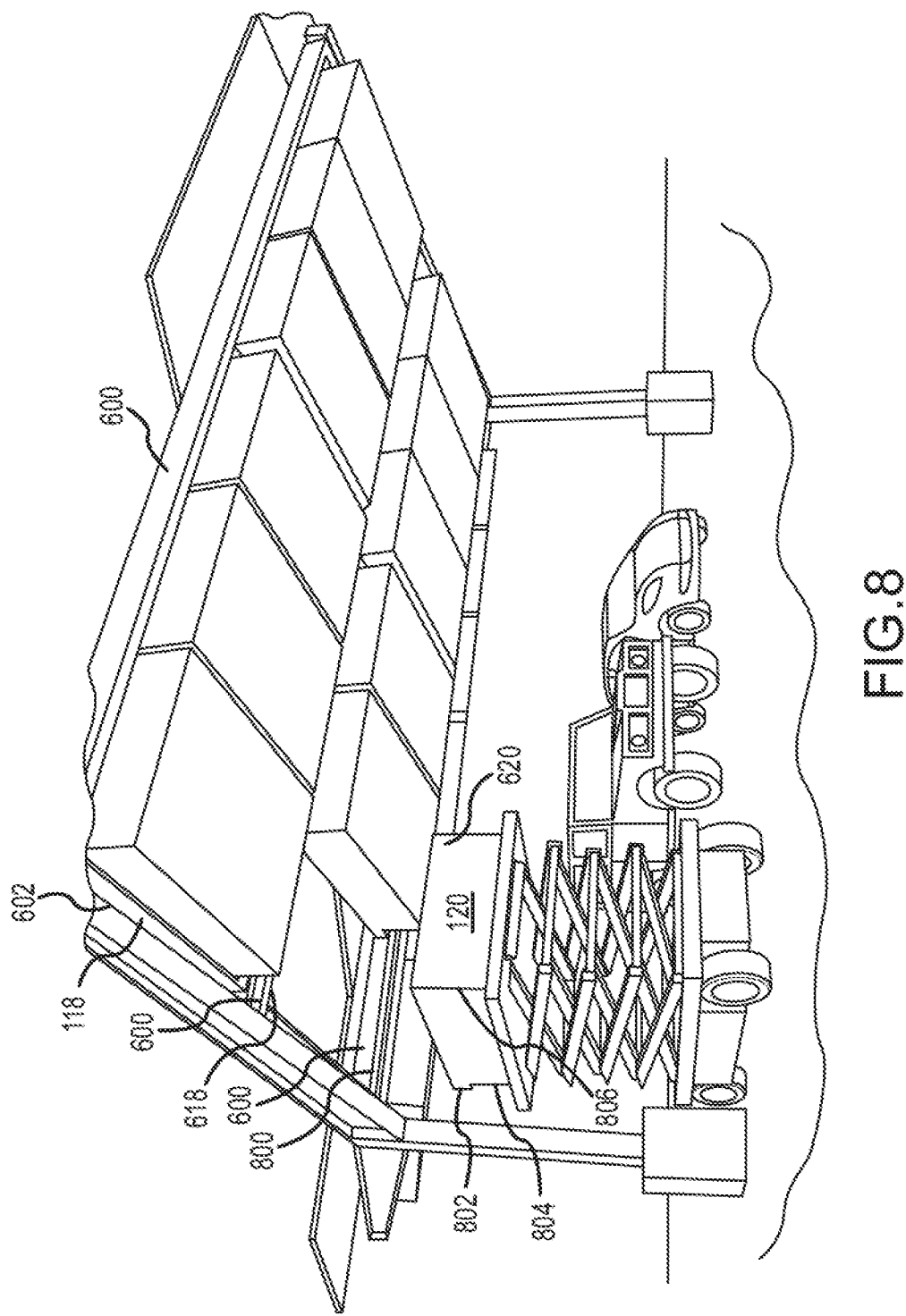
FIG. 8 shows an alternative configuration of the solar power canopy with a plurality of battery compartments consistent with the technology of the present application.

With reference now to FIG. 8, a variation of the configuration described in FIGS. 6 and 7 is provided. As shown in FIG. 8, the superstructure 118 includes a ledge 800 on one of the plurality of sidewalls 602. The battery compartment 120 would have a corresponding extension 802. To install the battery compartment 120, the extension 802 end of the battery compartment 120 would be angled up and over the ledge 800. The battery compartment 120 would be pivoted such that the leading end 804 of the battery compartment would move downward until the extension 802 engaged the ledge 800. The trailing end 806 would move upward until first connectors 618 engaged second connectors 620. In certain embodiments, the ledge 800 may be installed directly on a member 600 and the first connectors 618 may be installed on member 600 to eliminate the need for the superstructure 118.

Figure 9:
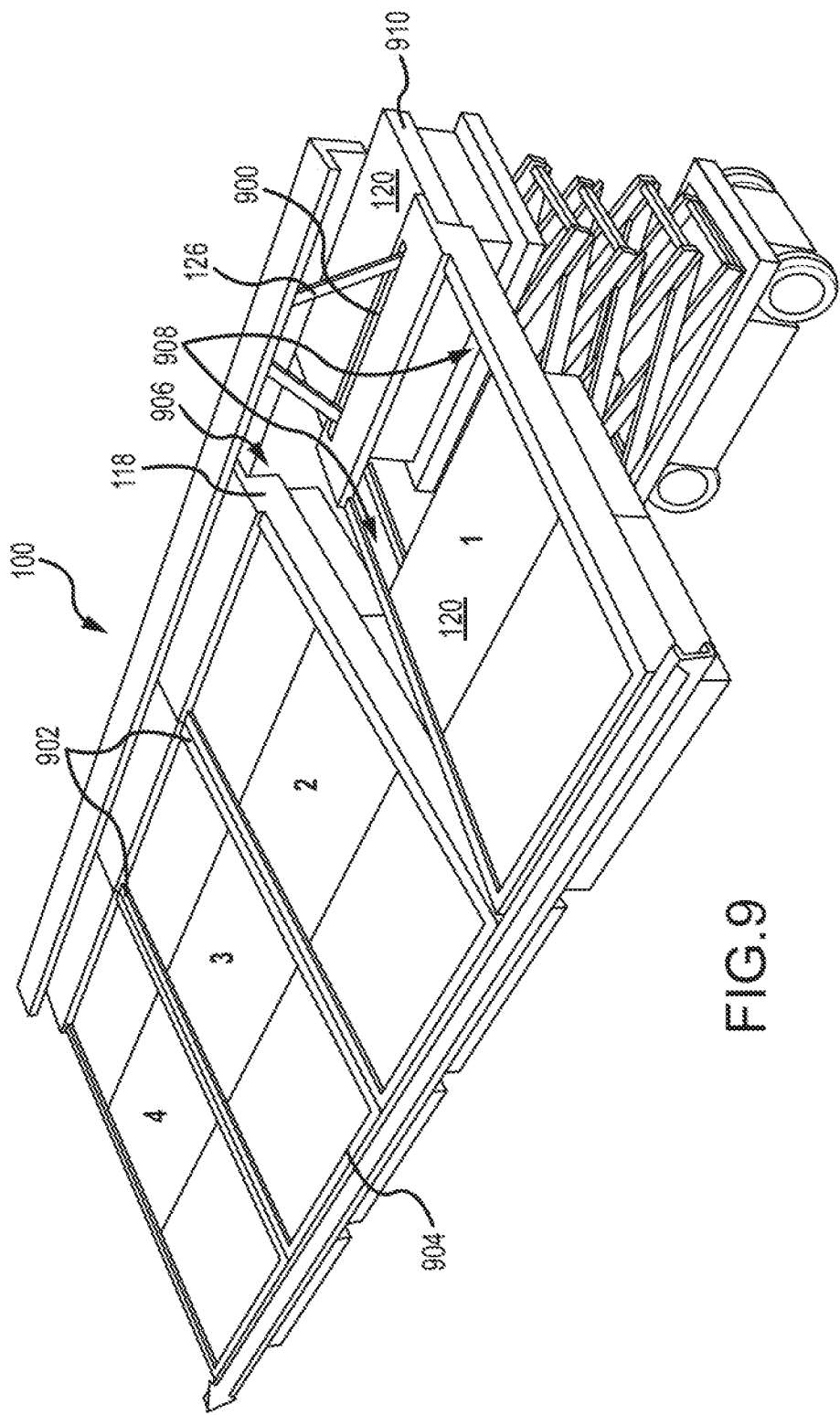
FIG. 9 shows an alternative configuration of the solar power canopy with a plurality of battery compartments consistent with the technology of the present application.

FIG. 9 shows another variation of the configurations described above where a superstructure 118 is pivotally mounted on the solar power canopy 100 by a linkage assembly 126. As shown perhaps best in FIG. 9, the linkage assembly may move in a channel formed in a top surface 900 of the superstructure 118. As can be appreciated, the superstructure 118, in this variation, is formed by opposed sidewalls 902 and a stop wall 904. The stop wall 904 is optional, but facilitates stopping the movement of a battery compartment 120 in the superstructure 118. A loading end 906 of the superstructure is open to allow the battery compartments 120 to be slid into the superstructure 118 as will be described. The opposed sidewalls 902 form opposed channels 908 having a C shape, for example. The channels 908 run substantially the entire length of the superstructure 118. The opposed channels 908 could form ledges instead of channels having an L shape. The battery compartments 120 includes opposed side extension surfaces 910. The opposed side extension surfaces are shaped to cooperatively engage the channels or ledges 908 such that the battery compartment 120 can slide along the channels or ledges 908 into the appropriate position. In operation, the superstructure 118 is pivoted from a closed (engaged) configuration to an open (load) configuration. Generally, the superstructure 118 is in a horizontal or slightly angled position. The battery compartment 120 is lifted and aligned with the superstructure such that the extension surfaces 910 can slidingly engage the channels 908. The battery compartment 120 is then slid along the channels to the appropriate position. When the battery compartments 120 are loaded/unloaded, the superstructure 118 is pivoted back to the closed configuration.

Figure 10:
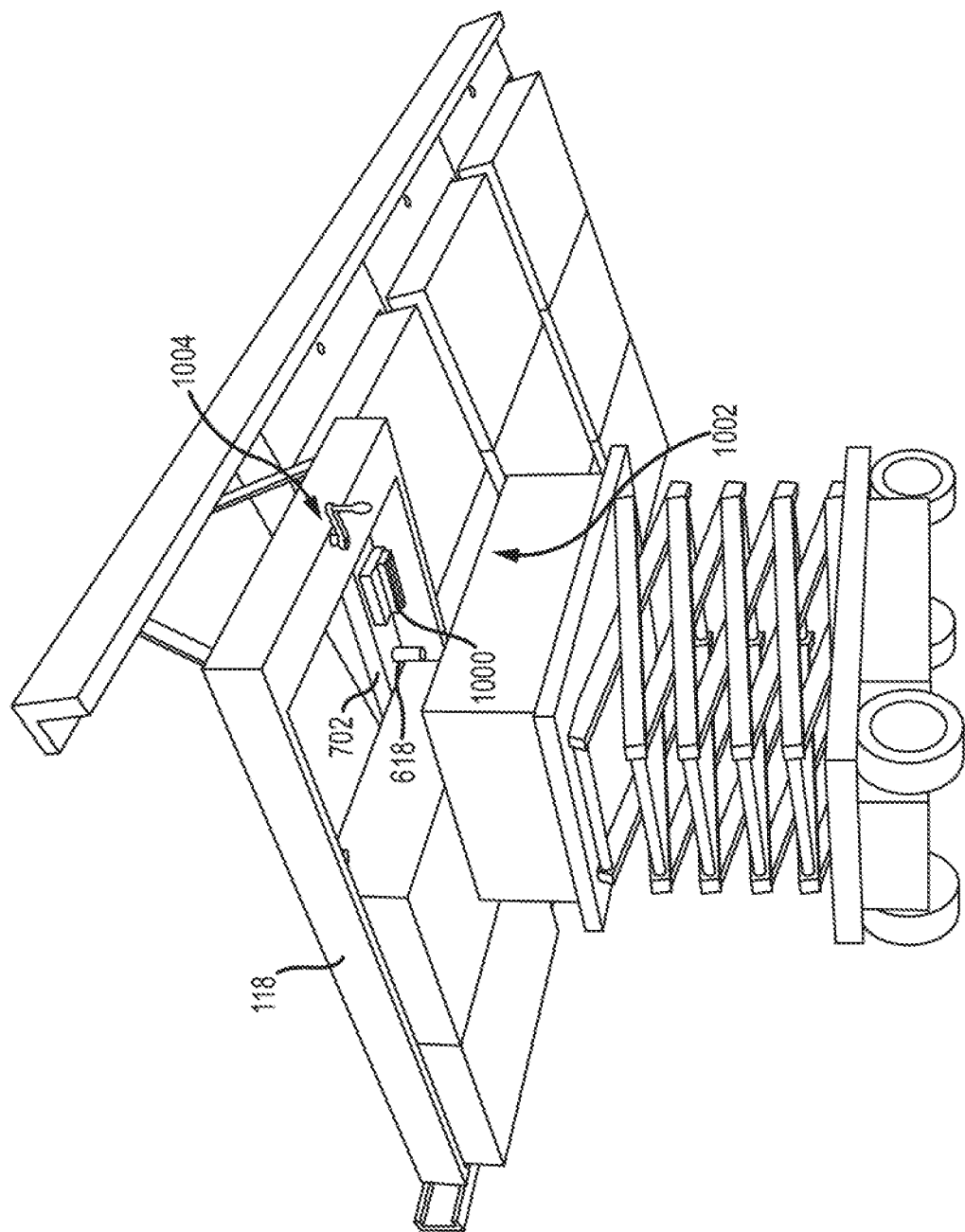
FIG. 10 shows detail on connecting a battery compartment to a solar power canopy consistent with the technology of the present application.
Figure 10A:
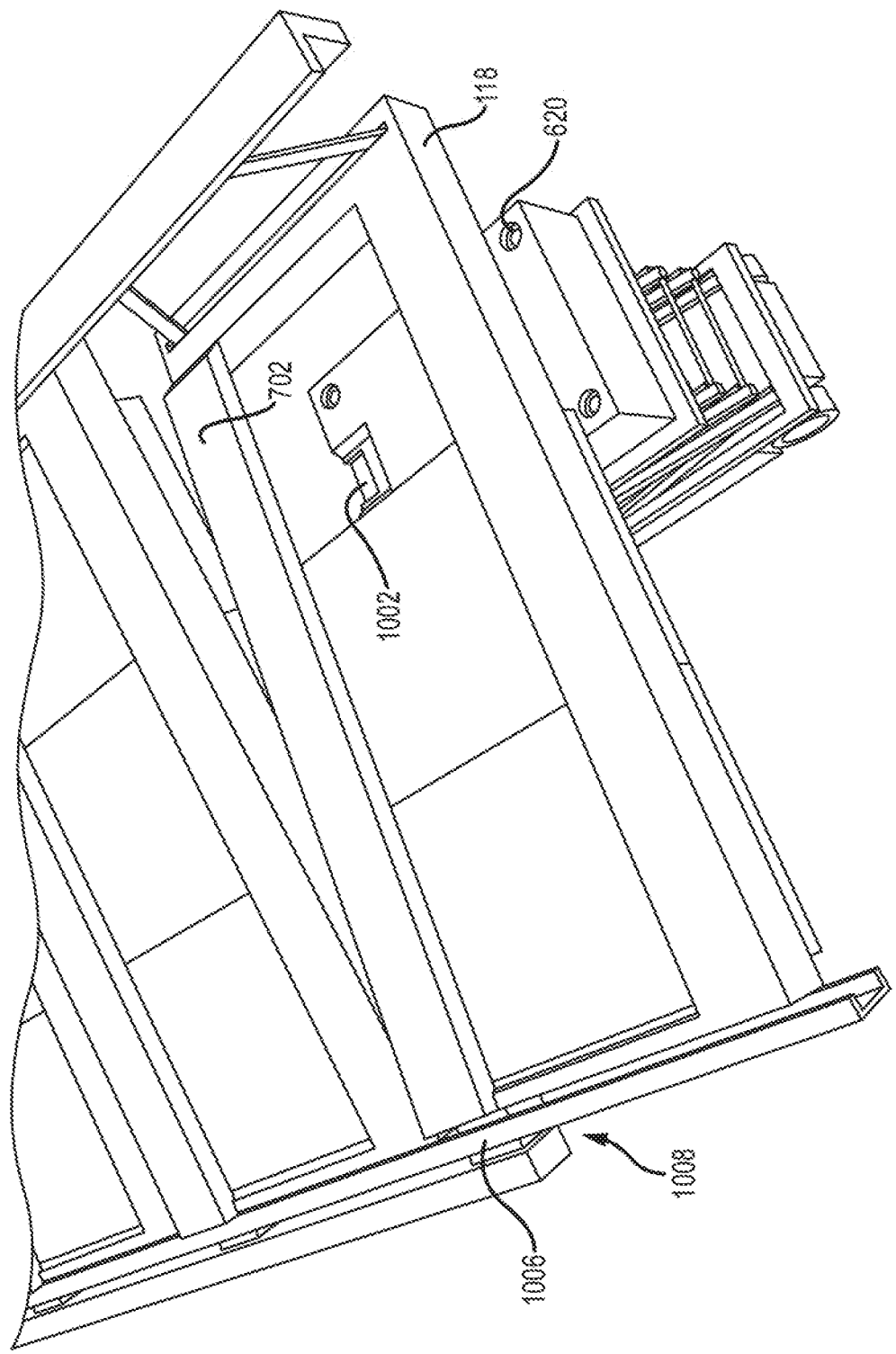
FIG. 10A shows detail on connecting a battery compartment to a solar power canopy consistent with the technology of the present application.
Figure 10B:
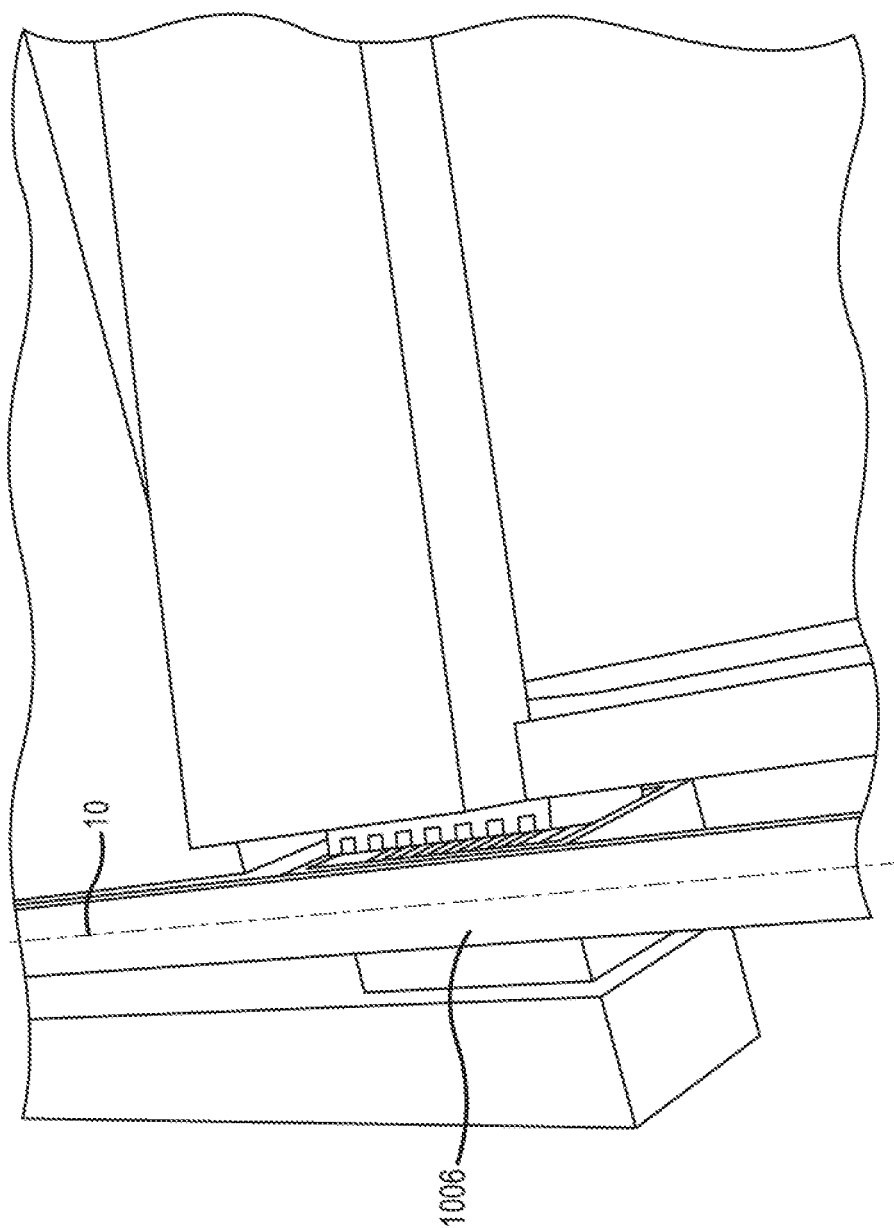
FIG. 10B is another view of connecting a battery compartment to a solar power canopy as shown in FIGS. 10 and 10A.

With reference to FIGS. 10, 10A, 10B, and 10C, sample power connections are shown. The superstructure 118, shown in FIG. 10, includes an extended surface 702 to which the first connectors 618 are attached. The extended surface 702 could become a cover or top surface. The extended surface 702 also has a power and data interconnection interface 1000. The power and data interconnection interface 1000 (FIG. 10) could be a single interface, as shown, or multiple interfaces. The battery compartment 120 would have a corresponding power and data interconnection interface 1002 (see FIG. 10A) forming a blind mate plug and socket connection or the like. FIG. 10 also shows that the pivoting of the superstructure 118 may be accomplished using a lift (as described above) or a gear and crank assembly 1004 as shown in FIG. 10. The bus interconnecting the banks of battery compartments would similarly have a power/data connection interface 1006 (see FIG. 10B) that mates with a similar power/data connection 1008 interface (see FIG. 10C) on the battery compartment. As shown in FIGS. 10B and 10C, the power/data connection interfaces 1006 and 1008 disengage when the superstructure 118 pivots about axis 10 (or any other axis).

Figure 11:
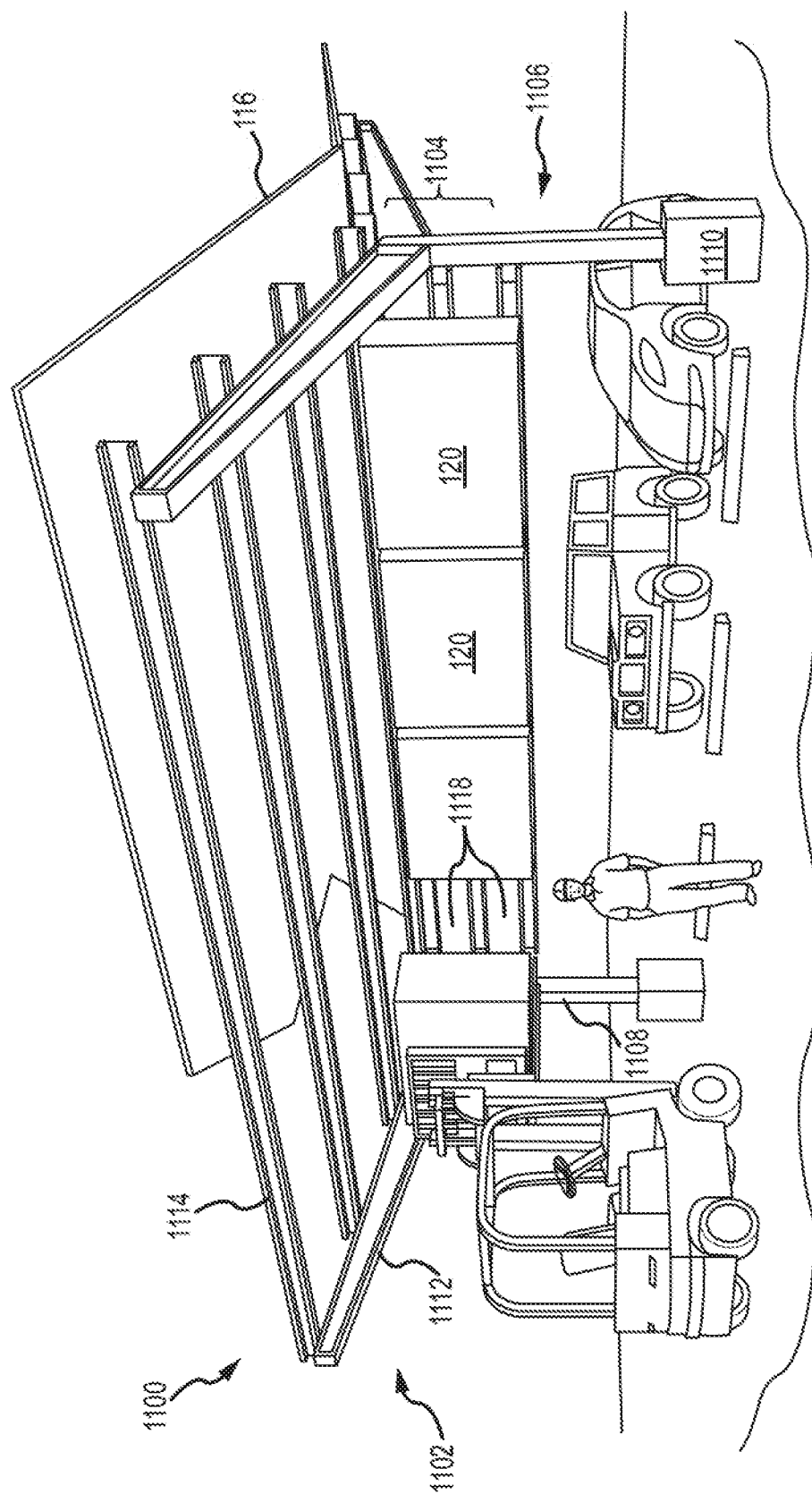
FIG. 11 shows an alternative configuration of the solar power canopy with a plurality of battery compartments consistent with the technology of the present application.

FIG. 11 shows an alternative embodiment of a solar power canopy 1100. Solar power canopy 1100 includes a solar canopy 1102 and a battery system 1104. The solar canopy 1102 includes a frame structure 1106 comprising, in this exemplary embodiment, a generally vertical center support strut 1108 anchored to the ground via a concrete coupling 1110 and a plurality of generally horizontally extending struts 1112. The struts 1112, in this exemplary embodiment, angle upwards from the center support strut 1108 forming a shallow Y shape for the solar canopy 1102. The struts 1112 may support members 1114 as shown. Solar panels 1116 (shown partially cut away) are supported on the members 1114.

The battery system 1104 includes, among other things, one or more battery carry beams 1118 extending between two central support struts 1108 (which may be designated left $1108_L$ and right $1108_R$ to distinguish the two as necessary). FIG. 11 currently shows two (2) battery carry beams 1118 vertically oriented with an upper and lower battery carry beam, but one (1) or more than two (2) battery carry beams 1118 are possible. The number of battery carry beams is largely a function of load and stability. The battery compartments 120 are connectable to the battery carry beam(s) 1118 using first connectors 618 and second connectors 620 that can be conventional connectors, such as, for example, bolts and nuts, flanged connections, hooks and lips, or the like. The battery compartments 120 would be coupled to a bus using running in one or both of the battery carry beam(s) 1118 using a blind power and data connection interface as described above. Assuming a lip on the battery carry beam(s) 1118 and a corresponding hook (or corresponding hooks) on the battery compartment 120, the battery compartment may be mounted by lifting the compartment vertically, using a forklift or the like, to a first position. The battery compartment would move horizontally until the hooks are aligned with the lips. The battery compartment would next be moved vertically until the hooks engage the lips. The downward motion and/or an additional inward motion also would cause the power and data connection interfaces to engage. Alternatively to a blind mating, the power and data connection interfaces could be via a plug and socket arrangement such that the operator subsequently plugs in the unit.

Figure 12:
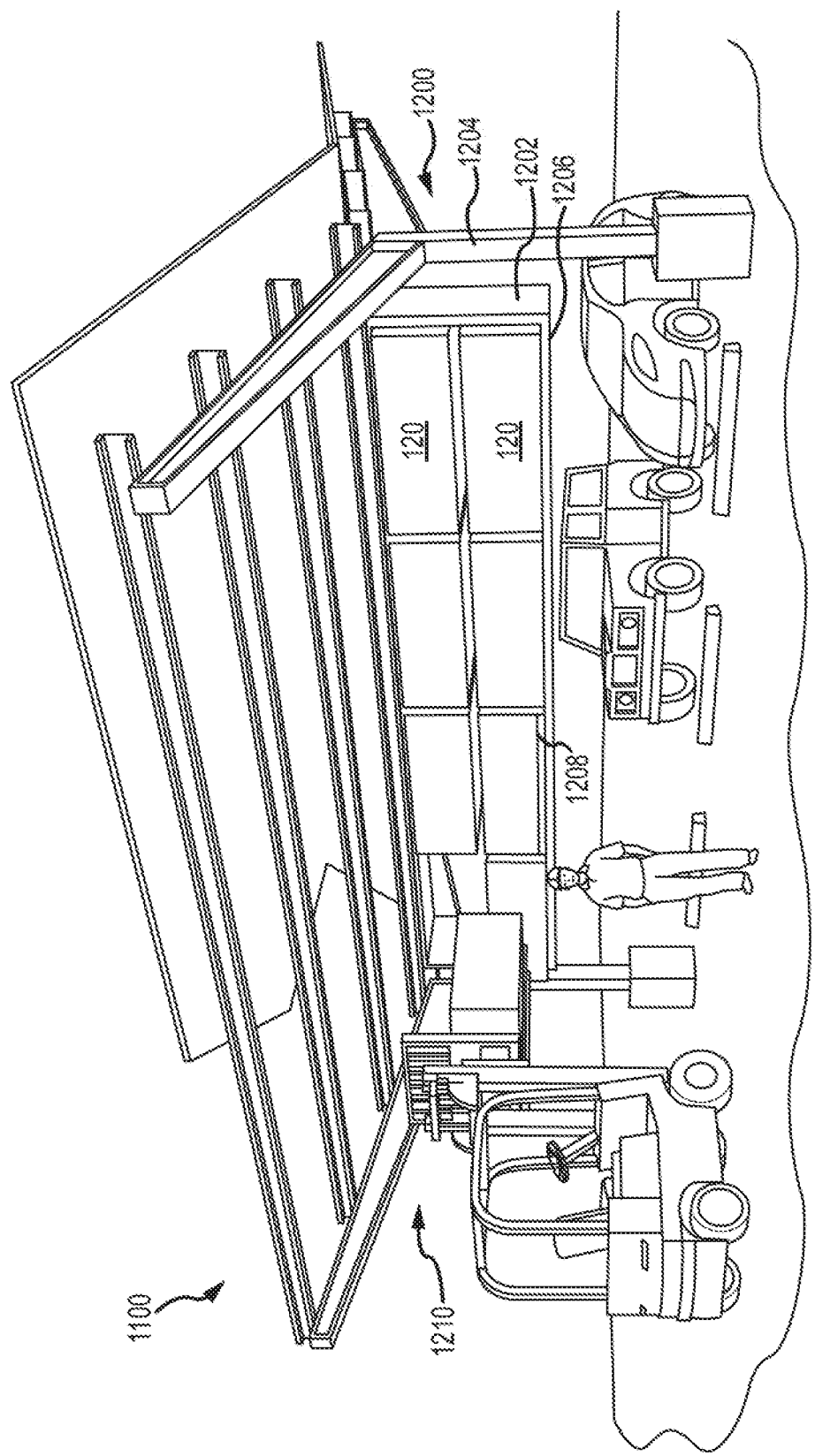
FIG. 12 shows an alternative configuration of the solar power canopy with a plurality of battery compartments consistent with the technology of the present application.
Figure 12A:
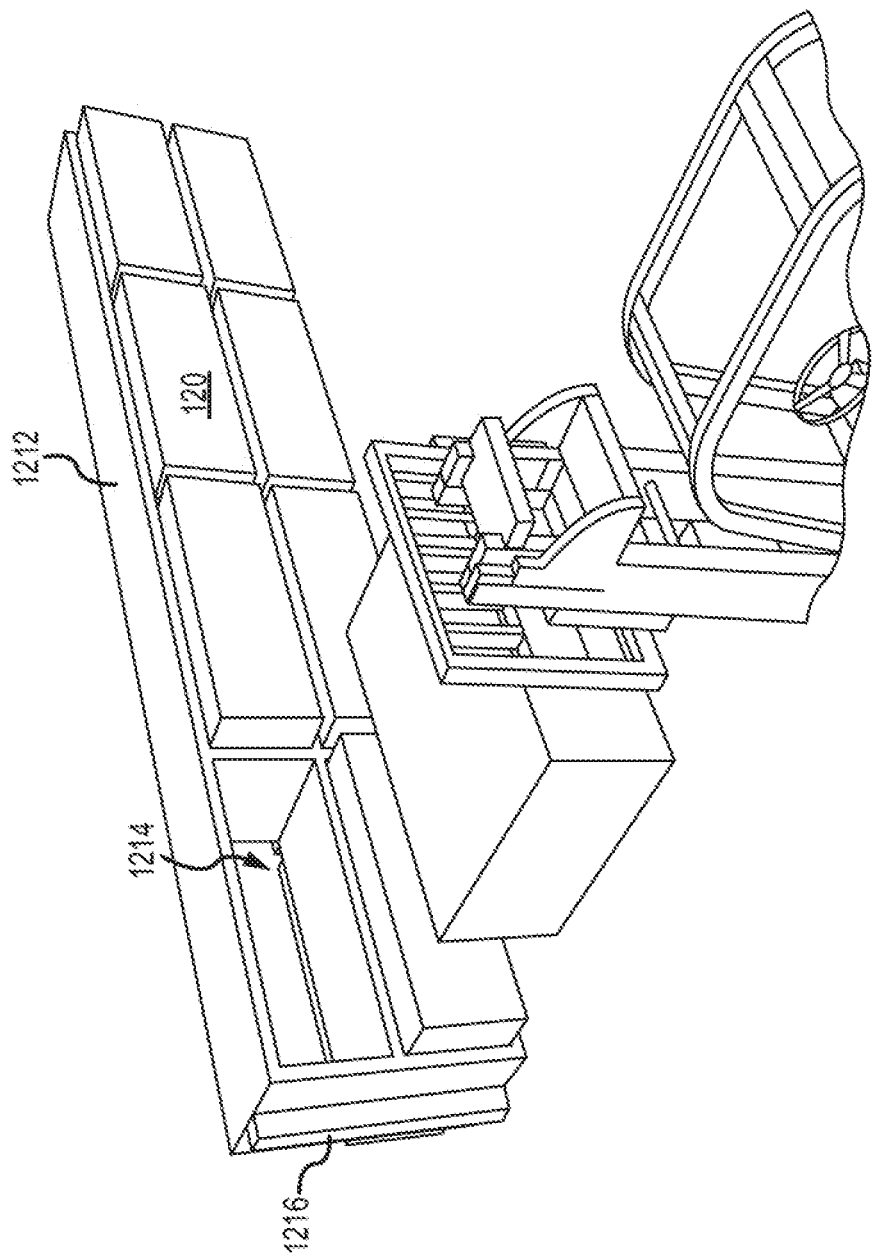
FIG. 12A shows details of the solar power canopy of FIG. 12.
Figure 12B:
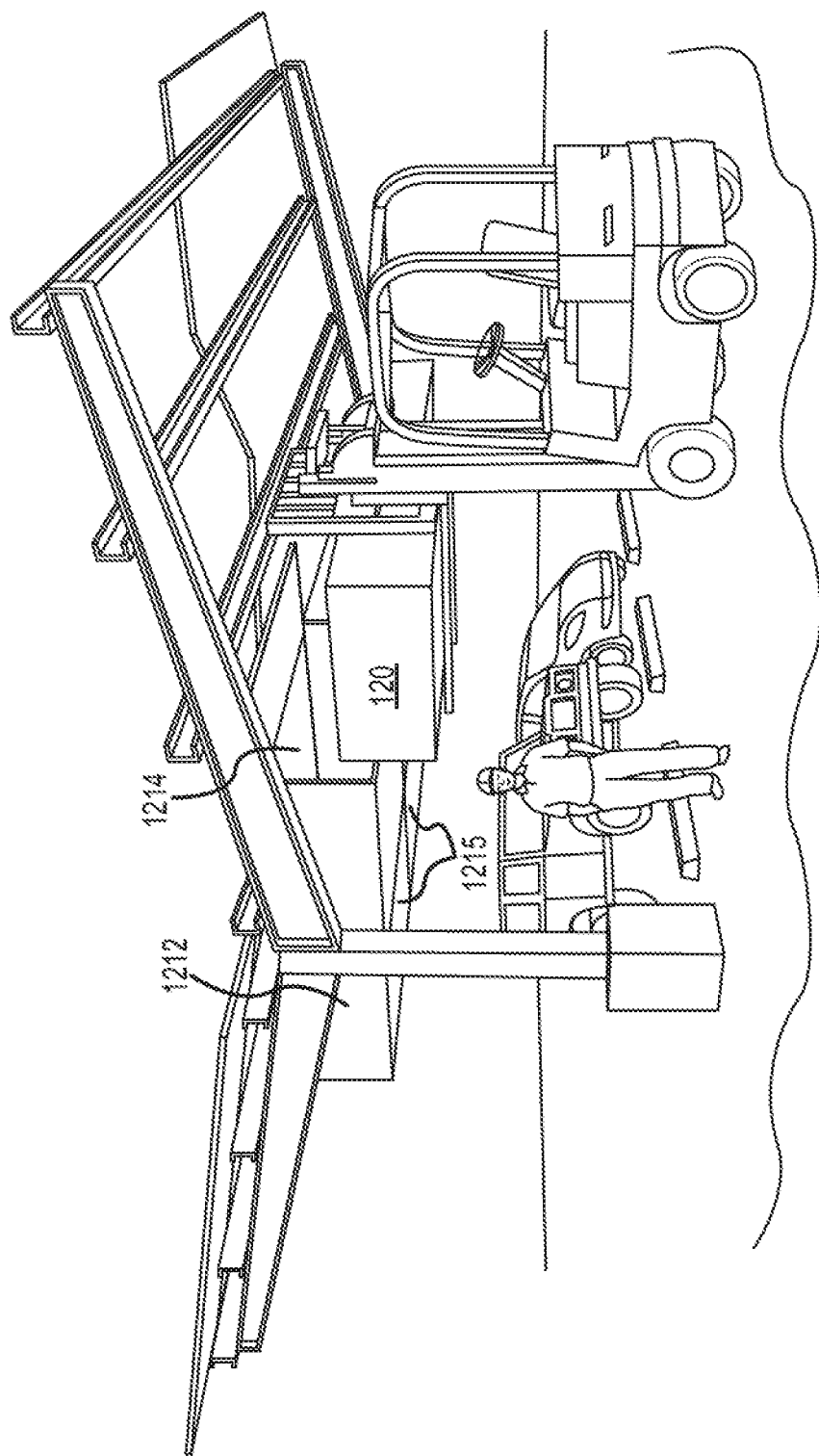
FIG. 12B shows an alternative configuration of the solar power canopy of FIGS. 12 and 12A.

With reference to FIG. 12, a variation of the configuration shown in FIG. 11 is provided. The solar power canopy 1100 includes a central dock unit 1200. The central dock unit 1200 includes vertically hanging supports 1202 (which could be the vertical struts 1204, in certain embodiments, or separate as shown) and one or more horizontally extending members 1206 having a length L, a thickness T, and a width W where the width W is sufficient to hold a battery compartment 120. The dock unit 1200 as explained here may include one or more horizontally extending members. The dock unit, as described herein below, may comprise other cabinet, cradles, or cubicle structures. The horizontally extending members 1206 may have lips 1208 to inhibit the battery compartment(s) 120 from sliding once placed on the horizontally extending members 1206. The vertically hanging supports 1202 are coupled to the solar canopy frame 1210 such that the vertically hanging supports 1202 and the horizontally extending members 1206 form a shelf. As shown, one horizontally extending member 1206 is provided onto which two (2) battery compartments can be stacked vertically. In certain embodiments, a second horizontally extending member 1206 may be provided between the stacked battery compartments. The battery compartments are placed in the shelf unit by a lift mechanism, such as a forklift, as shown. FIG. 12A shows a similar shelf unit 1212 where each battery compartment 120 fits into a dock unit carried by the shelf unit 1212. FIG. 12A shows eight (8) battery compartments 120 in eight (8) docks 1214, but more or less battery compartments and docks may be provided. The shelf unit 1212 may be integrated into the solar canopy frame 1210 or provided with a first connector 1216 that couples to a second connector on the solar canopy frame 1210 (not shown) such as a tongue and groove connection or the like. FIG. 12B shows yet another configuration where the shelf unit 1212 has side-by-side docks 1214 with or without a separating wall 1215. Similar to the above, the battery compartments 120 are placed using a lift mechanism, such as, for example, a forklift. FIG. 12C shows the shelf unit 1212 with side-by-side docks 1214 rather than stacked docks. As shown in FIG. 12C, the docks could each have front panels 1218, such as the flip doors/panels shown. Also, the side-by-side docks could further include a central spine support 1220. Notice, the stacked unit and the side-by-side unit could be combined in certain embodiments.

Figure 13:
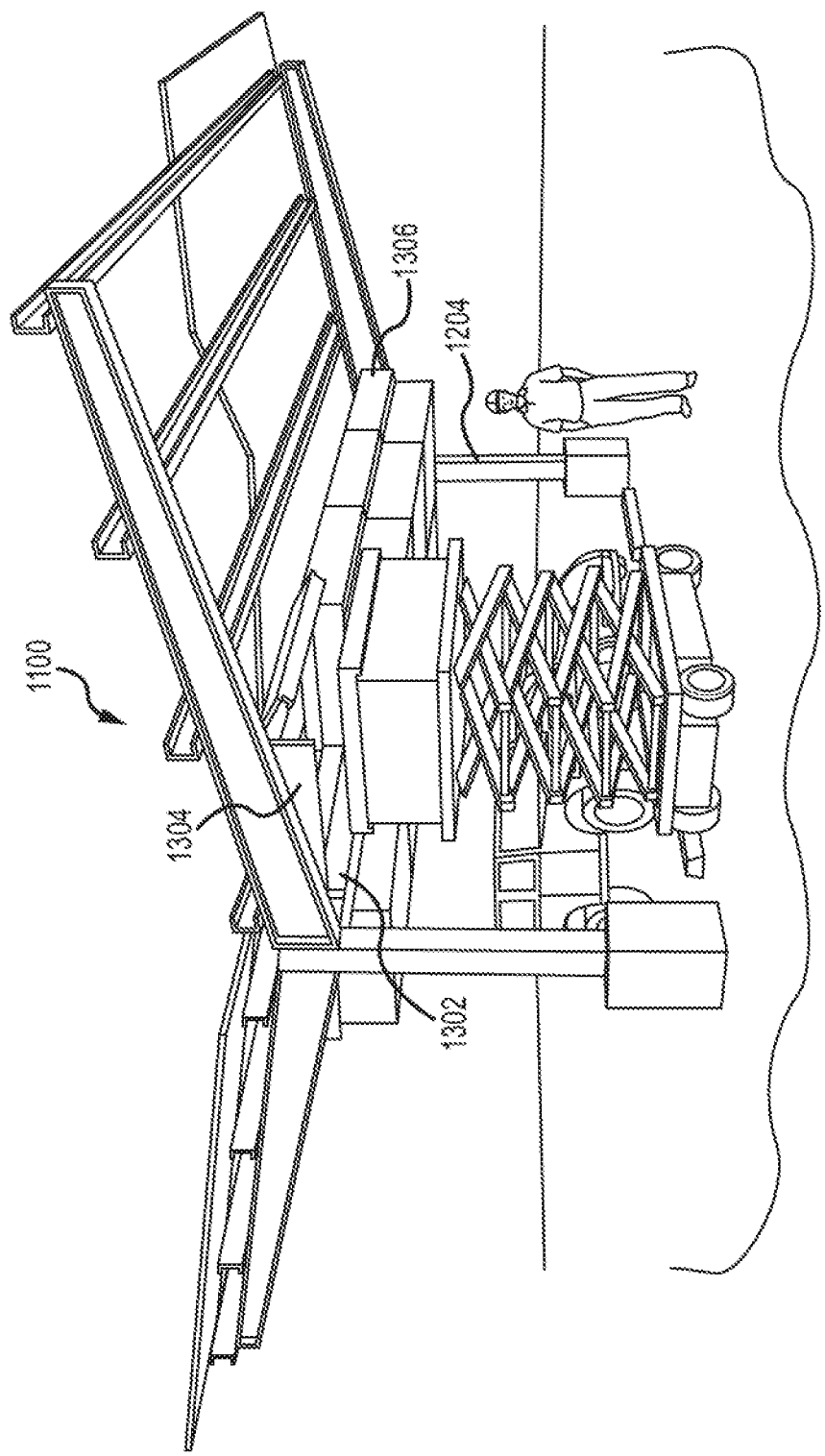
FIG. 13 shows a configuration of the solar power canopy with a plurality of battery compartments consistent with the technology of the present application.

FIG. 13 shows another configuration of the solar power canopy 1100. In this exemplary embodiment, a first or central beam 1302 extends between the vertical supports 1204. A central beam contemplates a symmetrical solar power canopy 1100 as shown, but the solar power canopy 1100 does not need to be symmetrical and may take a cantilever or other shape. A plurality of transverse beams 1304 extend axially outward from the central beam 1302 where each transverse beam 1304 is separated from a next transverse beam 1304 by a distance D sized to allow a battery compartment to fit between successive transverse beams 1304. A front panel 1306 is pivotally coupled between successive transverse beams 1304. As shown best in FIG. 13A, the central beam 1302 and the front panel 1306 each have a ridge 1308 generally formed by an inwardly extending surface 1310 and an upwardly extending lip 1312. The battery compartments 120 are formed with corresponding hooks 1314 to mate with the ridge 1308. The ridge and hook assembly may generically be referred to as mechanisms such that a first mechanism engages a second mechanism, and the like, to couple the compartment to the canopy. The hooks 1314 are similarly formed by an outwardly extending surface 1316 and a downwardly extending lip 1318.

Figure 13A:
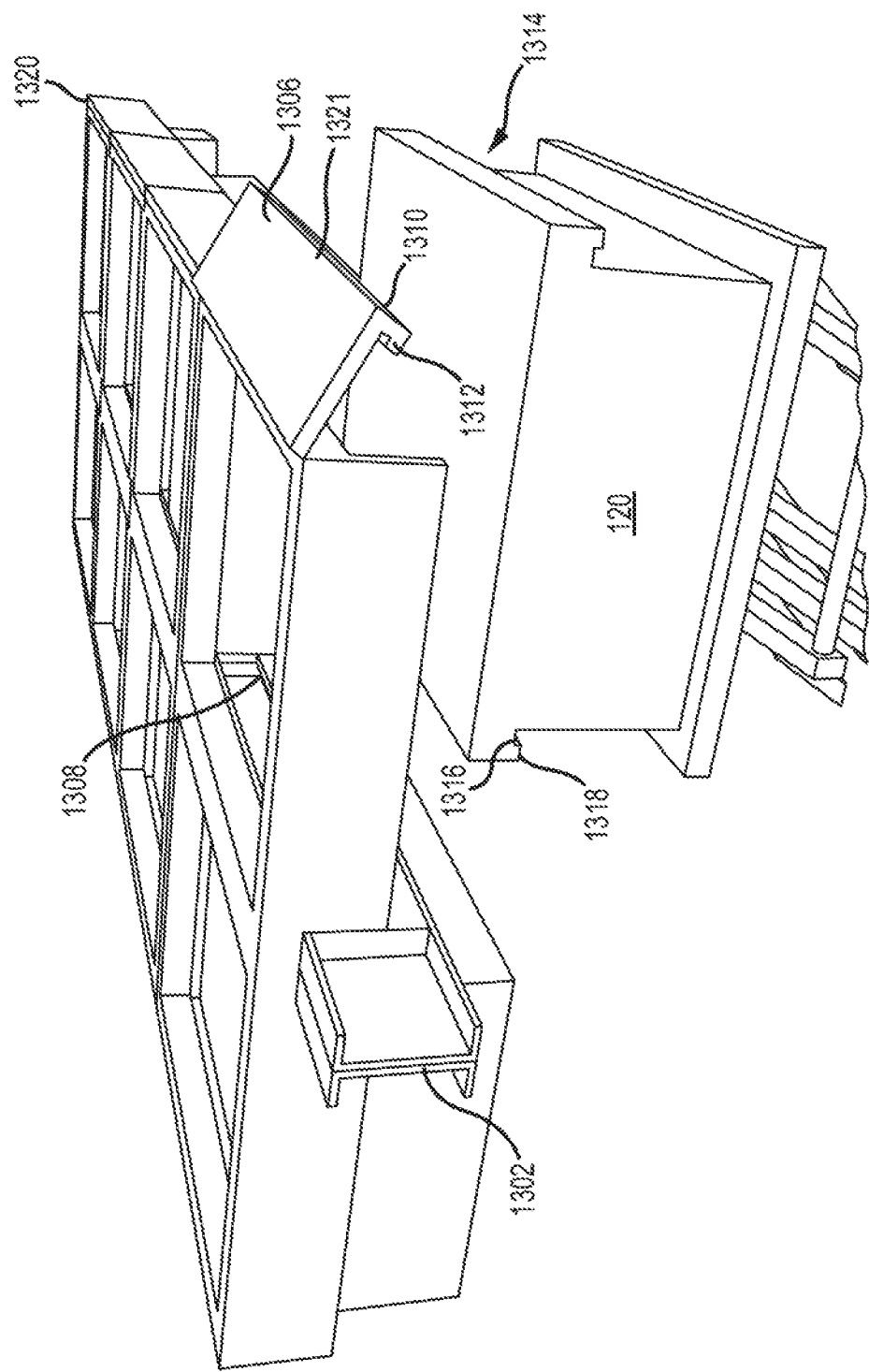
FIG. 13A shows a portion of the solar power canopy of FIG. 13.

To place the battery compartment 120 in the unit shown in FIG. 13, the front panel is flipped from a closed (engage) position 1320 to an opened (load) position 1321. The battery compartment 120 is lifted by a lift mechanism, such as a scissor lift as shown, until the hook 1314 corresponding to the central beam is above the ridge 1308 on the central beam. The battery compartment is next moved horizontally until the hook 1314 and ridge 1308 are aligned. The front panel is flipped from the opened (load) position to the closed (engage) position, which should align the second hook 1314 and ridge 1308. The battery compartment is lowered until the hooks 1314 engage the ridges 1308. As shown in FIGS. 13 and 13A, the battery compartment is generally loaded into the superstructure in a horizontal manner, meaning, in this usage, as generally parallel to the ground or support surface. If the successive transverse beams 1304 also are generally parallel to the ground or support surface, the horizontal lift works. If the transverse beams 1304 are angled to conform with the struts 112, the transverse beams 1304 may be coupled using the scissor assemblies described above. Alternatively, the lift mechanism may have a surface that pivots to angle the battery compartment with the transverse beams 1304. Notice, the pivoting lift mechanism may be used in some of the above and below described embodiments to eliminate the scissor linkage assemblies.

Figure 14:
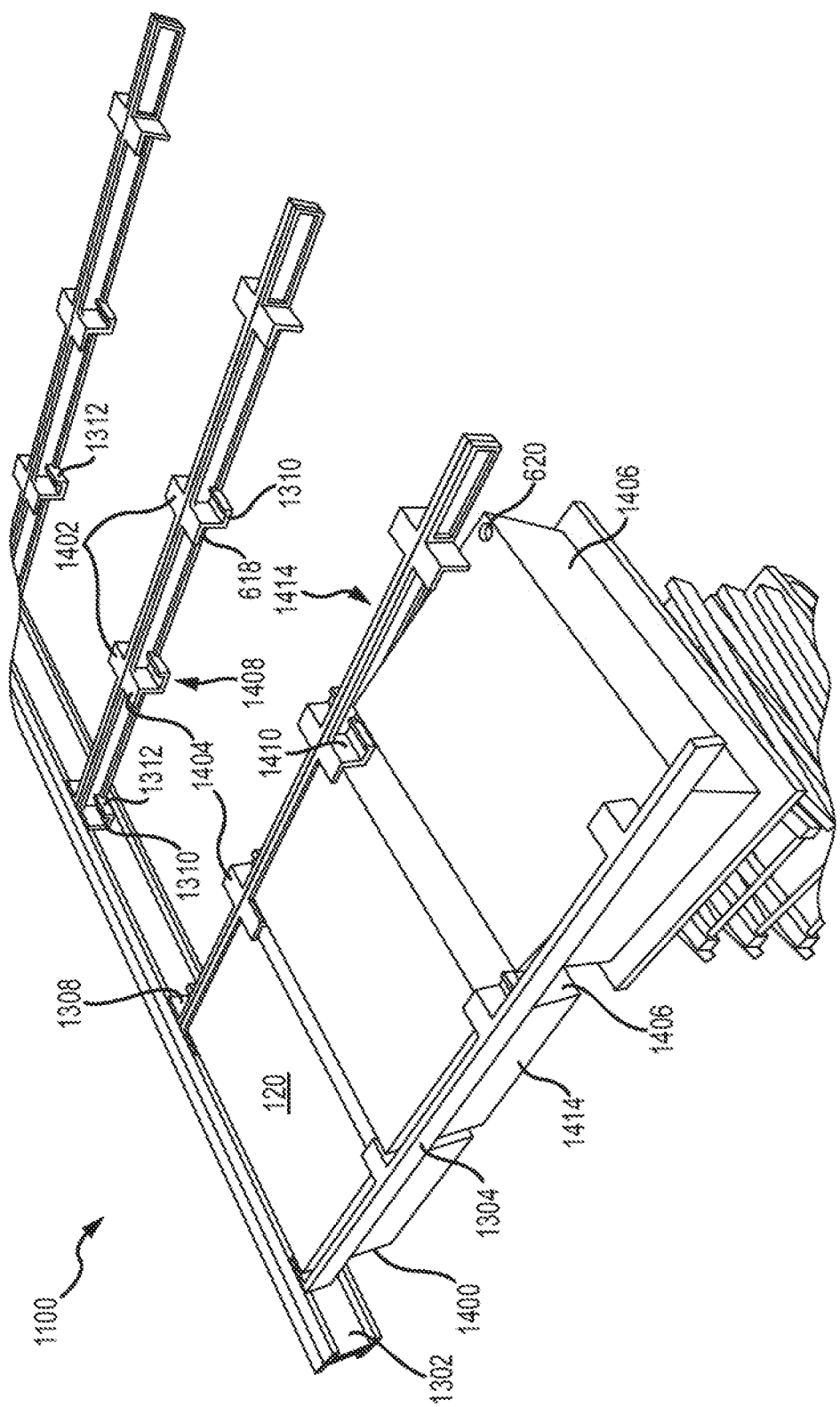
FIG. 14 shows a configuration of the solar power canopy with a plurality of battery compartments consistent with the technology of the present application.

FIG. 14 shows a similar configuration to FIG. 13 above. FIG. 14 only shows a portion of the solar power canopy 1100. The solar power canopy 1100 has the central beam 1302 with transverse beams 1304. The central beam 1302 has a plurality of ridges 1308 formed, as described above, with the inwardly extending surface 1310 and upwardly extending lip 1312. The battery canopy 120 would have a corresponding structure to couple to the ridges 1308 on the inward face 1400 of the battery canopy 120. Each transverse beam 1304 also would have a plurality of coupler plates 1402. The coupler plates 1402 would have a top surface 1404 connected to and extending from the transverse beams 1304. The coupler plates 1402 would have first connectors 618 as described above. The battery canopy 120 would have second connectors 620, as described above, on an outward face 1406 that would couple to the first connectors 618. The coupler plate 1402 also would have a hook assembly 1408. The hook assembly 1408 would have a flanged surface 1410 that abuts the outward face 1406 of one battery compartment 120 and the inward face 1400 of the next battery compartment 120. Similar to the above, the ridges, hook assemblies, first couplers, and second couplers may be referred to as mechanisms, where a number designator is used to identify different mechanisms. The central beam 1302 forms a ridge 1312, which comprises the inwardly extending surface 1310 and lip 1312. This configuration may allow for some counter balance between the battery compartments. This configuration, consistent with some of the above, provides each battery compartment with its own mounting to the solar power canopy. The ridges and/or hook assemblies of FIG. 14 could be replaced by the first and second connectors described herein. Additionally, instead of connecting on the inward and outward faces, the connectors could be designed for opposing sides 1414 of the battery compartment 120. As can be appreciated, to engage the battery compartment 120 with the solar canopy 1100, the battery compartment 120 is first moved to a location such that the ridge 1308 is aligned vertically with the hook assembly 1408. The battery compartment 120 is pivoted or tilted about its axis such that the end with the hook assembly 1408 is higher than the end with the second connectors 620. The battery compartment 120 is lifted into position within the solar canopy 1100 and the pivot or tilt is reverses until the hook assembly engages the ridge 1308 and the second connector 620 abuts the first connector 618 on the coupler plate. The first connector 618 and the second connector 620 are engaged or coupled to hold the battery compartment 120 in place.

Figure 15:
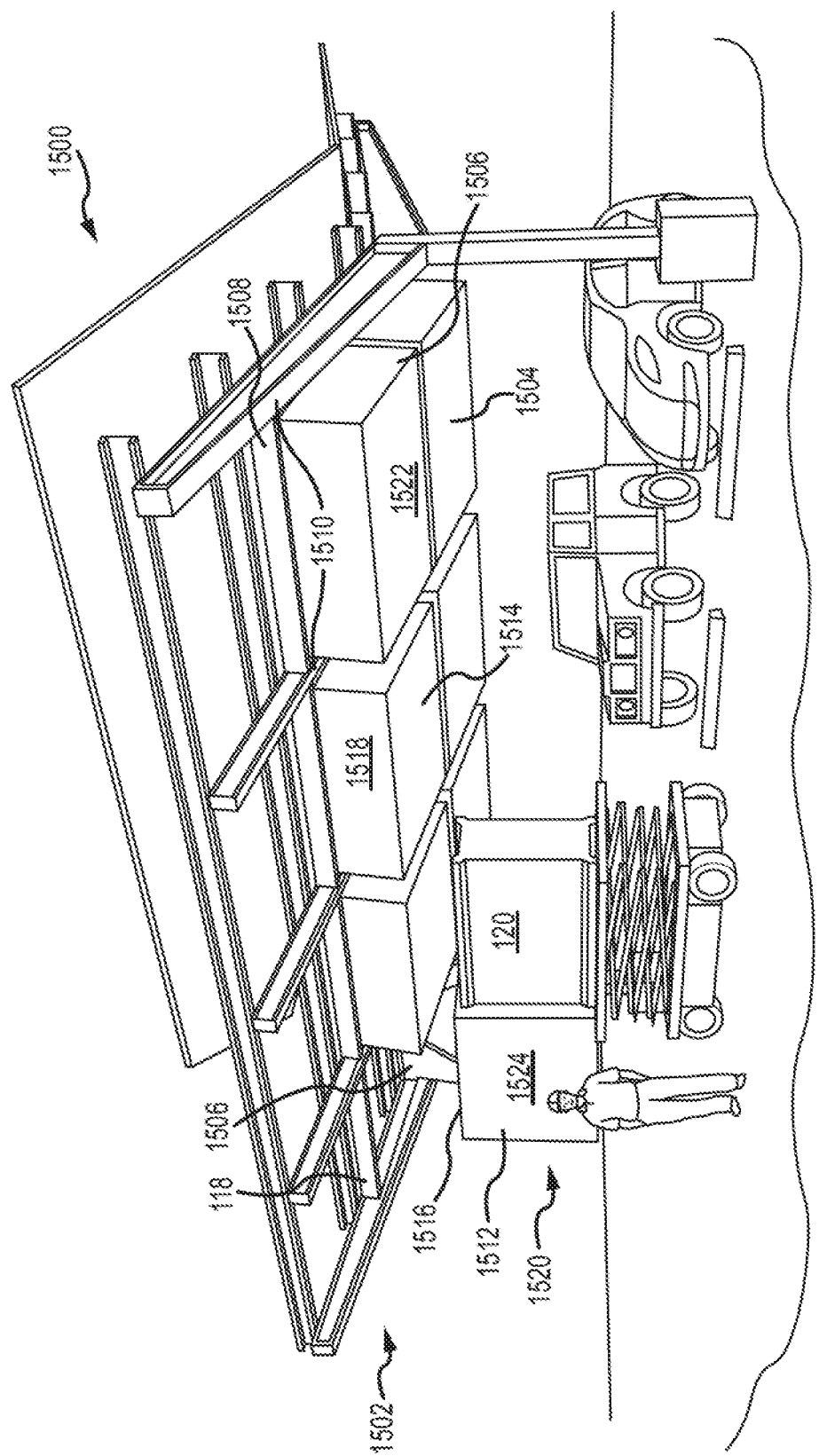
FIG. 15 shows a configuration of the solar power canopy with a plurality of battery compartments consistent with the technology of the present application.
Figure 15A:
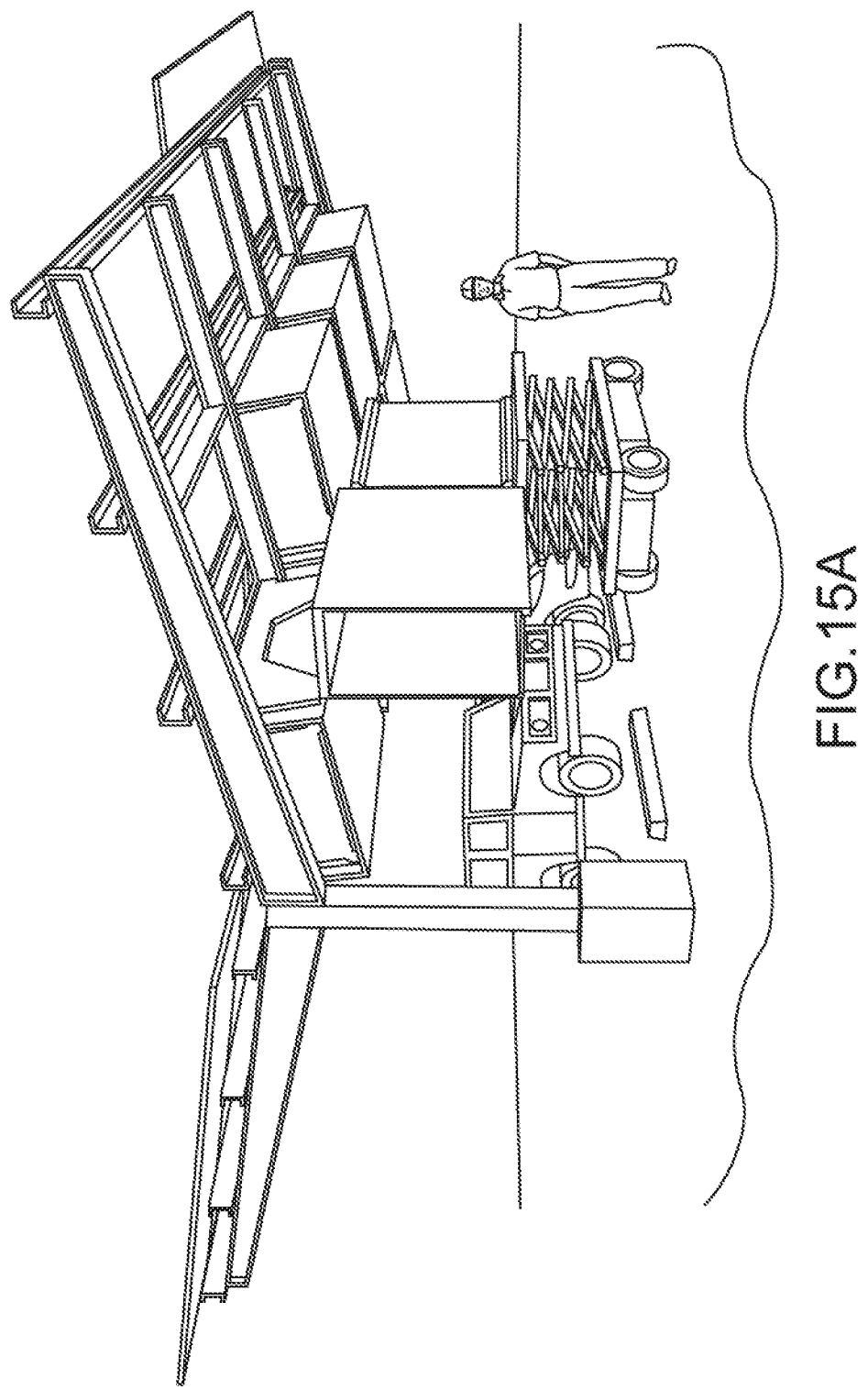
FIG. 15A shows another view of the solar power canopy of FIG. 15.

With reference now to FIGS. 15 and 15A, another configuration for a solar power canopy 1500 is provided. The solar power canopy 1500 includes a battery assembly 1502 comprising a superstructure 118, similar to the superstructures described above, and a battery holding cubicle 1504. The superstructure 118, in this exemplary embodiment, comprises a central facing wall 1506, an edge facing wall 1508, and opposed sidewalls 1510 coupling the central facing wall 1506 and the edge facing wall 1508. The battery holding cubicle 1504 is a box like structure having a top surface 1512, a bottom surface 1514 opposite the top surface, a first surface 1516, and a second surface 1518 opposite the first surface. The surfaces are connected to form a cavity 1520 or space 1520 shaped to slidingly receive the battery compartment 120. The battery holding cubicle 1504 is pivotally coupled, such as by a hinged connection, between the first surface 1516 and the central facing wall 1506 of the superstructure 118. In operation, the battery holding cubicle is pivoted from a closed (engage) configuration 1522 to an opened (load) configuration 1524. In the opened configuration 1524, the battery holding cubicle cavity 1520 is accessible such that a battery compartment 120 can be slid, horizontally, from a lift mechanism into the battery holding cubicle 1504. The battery holding cubicle 1504 is pivoted back to the closed configuration 1522 and latched or locked into place. The battery compartments would be similarly unloaded by unlatching or unloading the battery holding cubicle 1504 and pivoting it to an opened (load) configuration. The battery compartment 120 would be slid horizontally out of the cavity 1520. The battery holding cubicle 1504 may have stops 1524, such as lips or ridges, to inhibit sliding the battery compartment 120 completely through the cavity 1520.

Figure 15B:
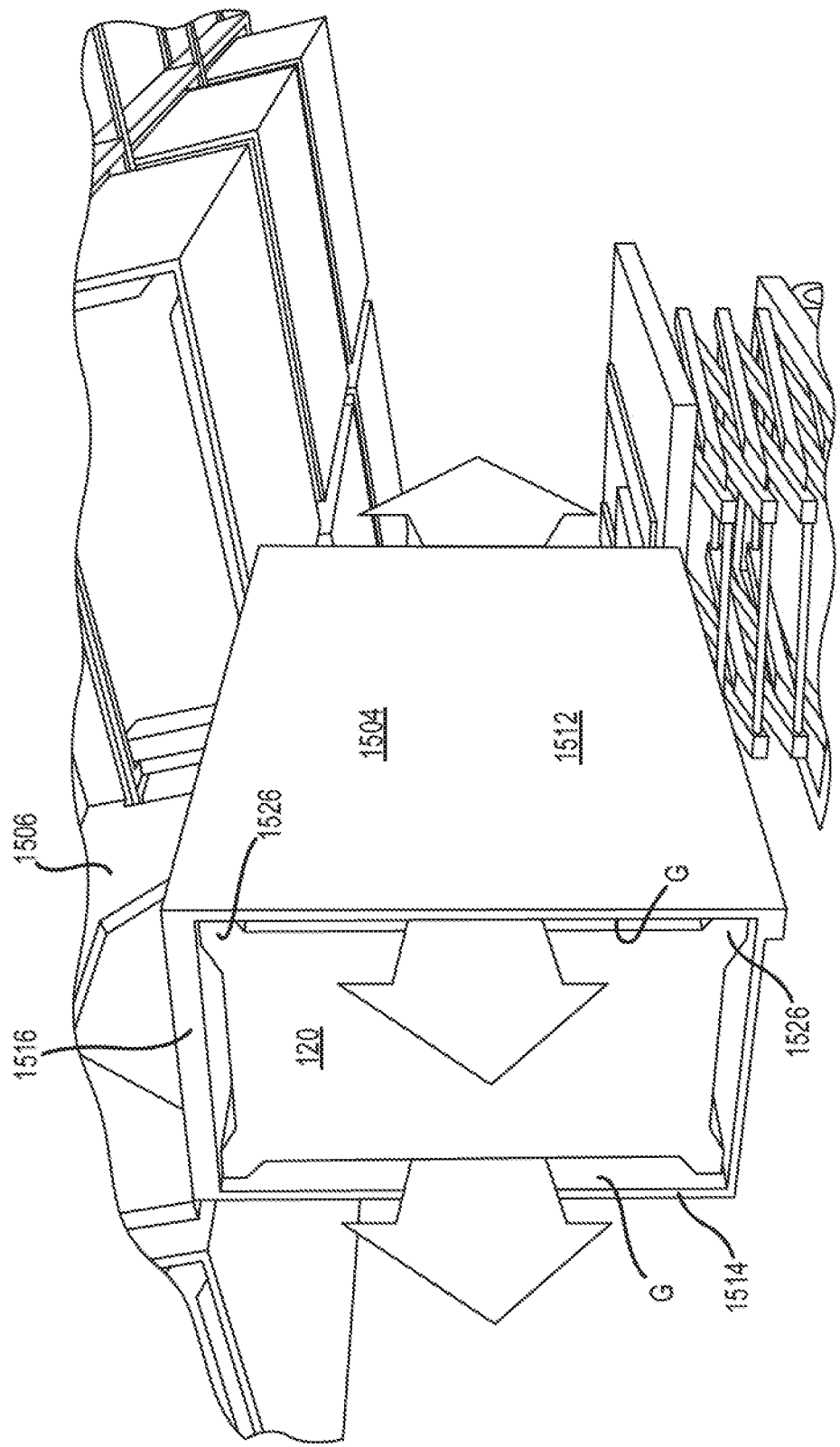
FIG. 15B shows additional detail of a portion of the solar power canopy of FIGS. 15 and 15A.

The battery compartments 120 have flared corners 1526 as best seen in FIG. 15B. The flared corners 1526 hold the battery in the battery holding cubicle 1504 by provide gaps G between the battery compartment 120 and the top 1512 and the bottom surface 1514. The gaps G may provide additional air flow capacity to facilitate cooling of the battery compartments 120.

As can be appreciated, battery compartment 120, although modular, is cumbersome to move. The above described configurations generally disclose lifting the battery compartment 120 to a superstructure or other holding mechanism that is part of the solar power canopy. The lifting mechanisms shown include scissor lifts and forklifts to name but two exemplary lift types. The lifts may include a pivotable pad that tilts to allow arrangement of the battery compartment 120 from a horizontal position to an angled position, at least with respect to the ground or support surface, to facilitate movement from the lift device to the holding mechanism. FIGS. 16 to 20 show several configurations of cables, pulleys, cranes and winches that may be used to facilitate movement of the battery compartments 120. The battery compartment 120 is shown in several exemplary embodiments as being transported to the solar power canopy using a flatbed truck, which may be a pick-up truck as shown or another heavy duty truck, the battery compartments 120 may be moved by many vehicles including railways or the like.

Figure 16:
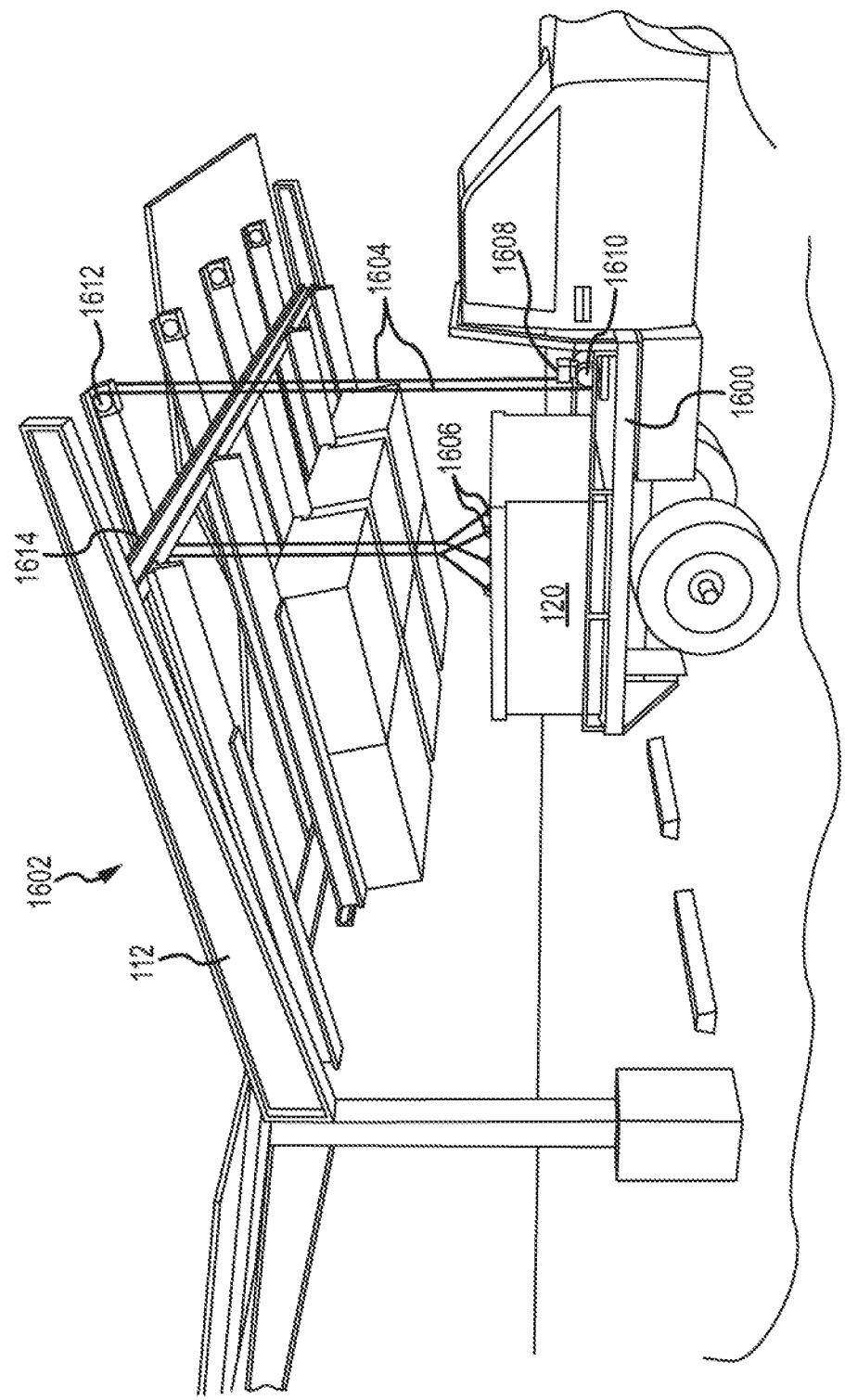
FIG. 16 shows a solar power canopy with a plurality of battery compartments consistent with the technology of the present application.

In any event, with reference to FIG. 16, a flat support surface 1600 is shown to support the battery compartment 120. The battery compartment 120 will have a first mechanism that is removably coupled to a second mechanism on the solar power canopy 1602, which may be any one of the above described mechanisms. The battery compartment on the flat support surface 1600 is moved to generally align the first and second mechanisms. In this case, the pick-up truck is positioned in such a location. A cable 1604, or a plurality of cables 16041-n, is attached at a first end 1606 to the battery compartment and at a second end 1608 to a winch 1610, which may be a hoist, windlass, or the like. One or more pulleys 1612 are attached to the beams of the solar power canopy. The cable 1604 is routed over the pulley(s) 1612. The winch 1610 raises the battery compartment between the flat support surface 1600 to the solar power canopy until the first and second mechanisms can be coupled to lock the battery compartment 120 in place. Once in place, the cable 1604 can be disconnected from the battery compartment. To lower the battery compartment 120, the cable 1604 is connected to the battery compartment and the slack in the cable 1604 is taken up. Once the cable 1604 is taunt, the first and second mechanisms are decoupled to unlock the battery compartment from the solar power canopy. The winch 1610 is operated to lower the battery compartment to the flat support surface 1600. As can be seen in FIG. 16, the pulley 1612 may be coupled to the horizontal support strut 112 with a joint (or track) 1614 or second pulley 1612 positioned to redirect the cable 1604 as necessary for each place to which a battery compartment will be located. As shown in FIG. 16A, a second pulley 1612 (or a joint) may be contained in a track 1616 that allows positioning of the second pulley 1612, as necessary. Once positioned, the second pulley 1612 would be locked to the track 1616. If a movable or slidable pulley 1612, for example, is used, the second pulley 1612 would be positioned prior to coupling the cable to the battery compartment.

Figure 17:
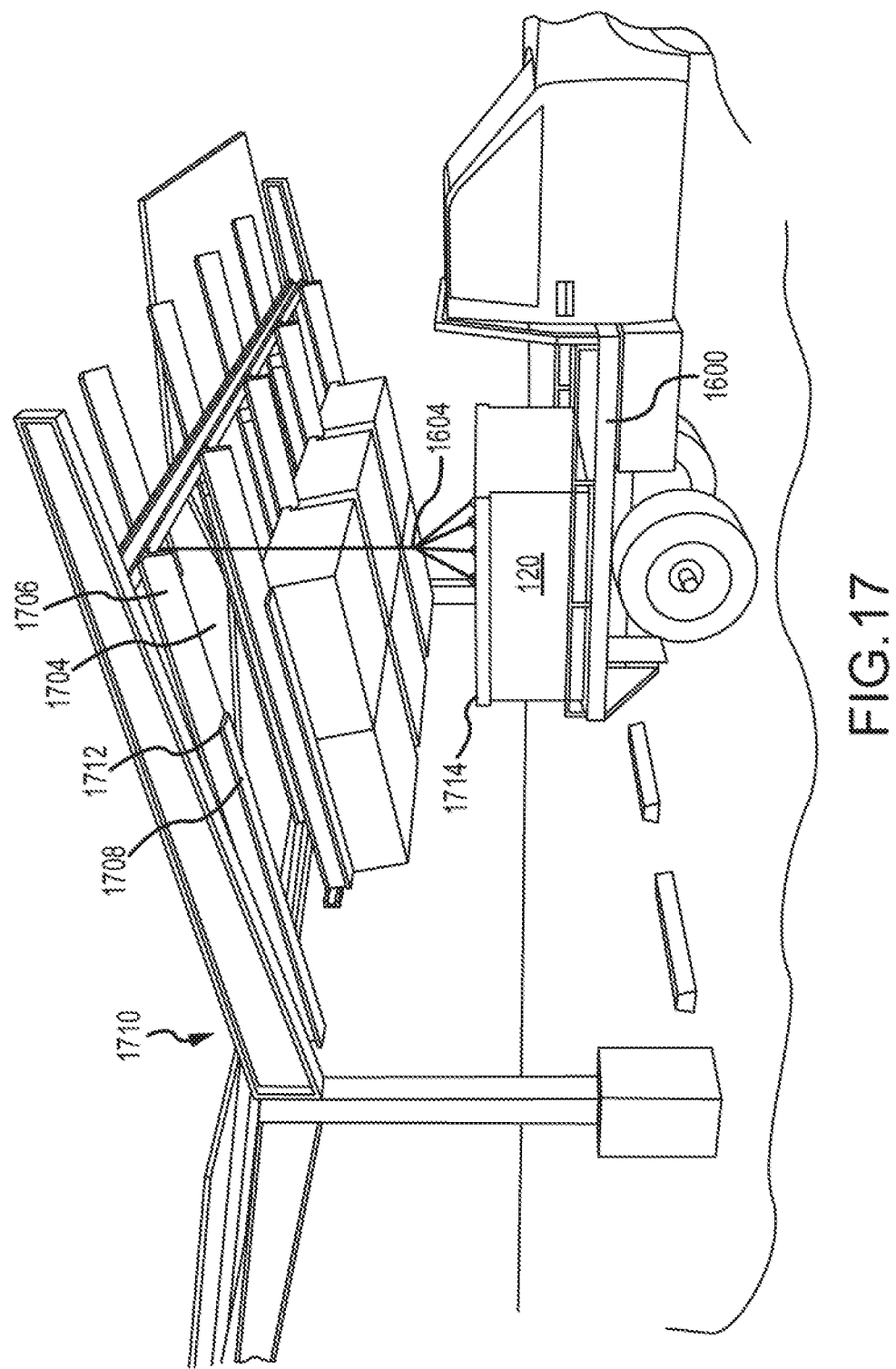
FIG. 17 shows a solar power canopy with a plurality of battery compartments consistent with the technology of the present application.
Figure 17A:
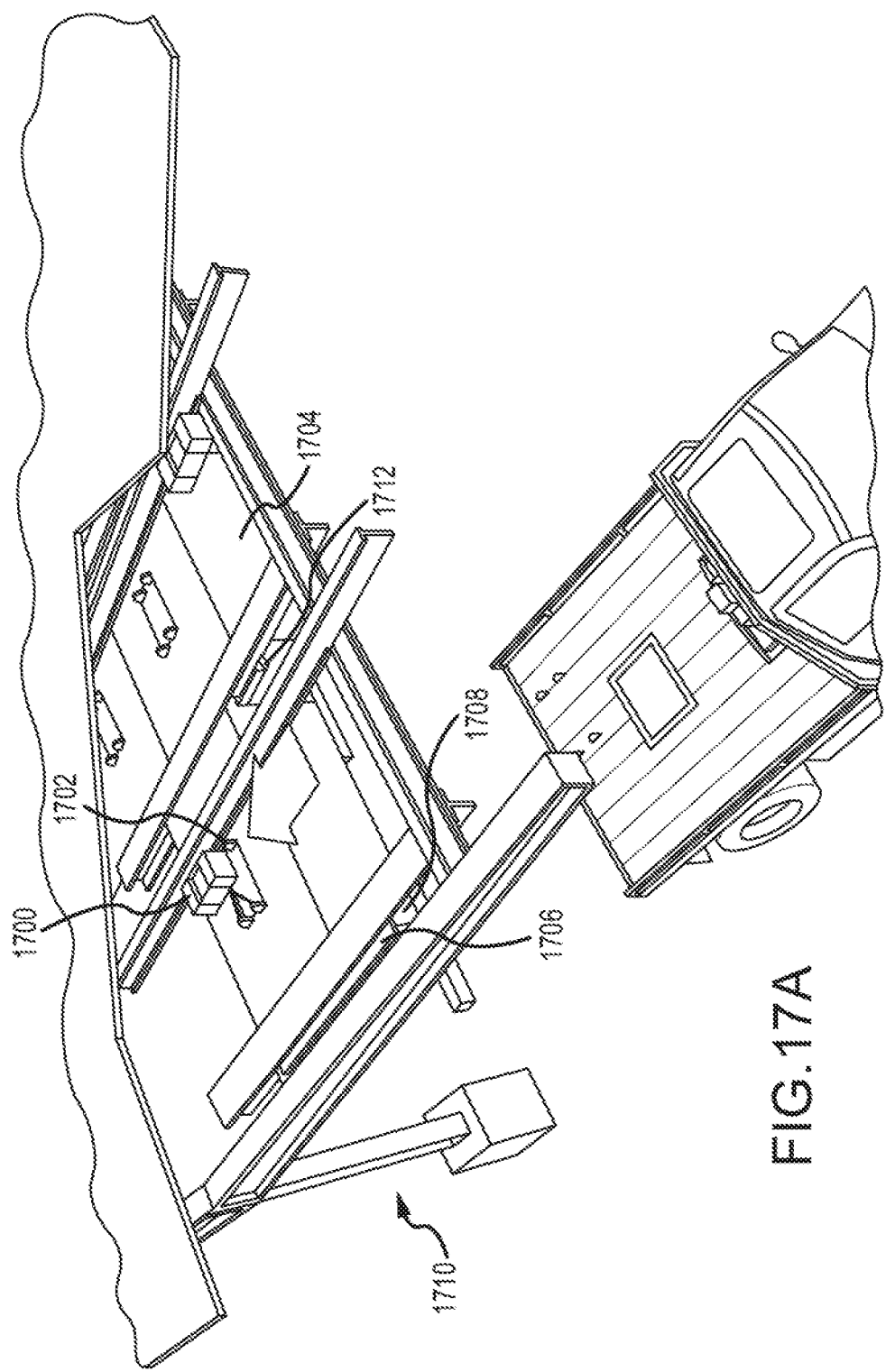
FIG. 17A shows additional detail of the solar power canopy of FIG. 17.

FIGS. 17, 17A and 17B shows a similar lift system. A flat support surface 1600 is shown to support the battery compartment 120. The battery compartment 120 will have a first mechanism that is removably coupled to a second mechanism on the solar power canopy 1602, which may be any one of the above described mechanisms. The battery compartment on the flat support surface 1600 is moved to generally align the first and second mechanisms. In this case, the pick-up truck is positioned in such a location. As best seen in FIG. 17A, a motorized winch 1700 is moved along a track 1702 to align with the battery compartment 120. A cable 1604 is coupled from the motorized winch 1700 to the battery compartment 120. The battery compartment 120 may subsequently be lifted to couple the first and second mechanisms. Alternatively, the battery compartment 120 may be aligned with a load/unload window 1704 that allows the battery compartment 120 to be raised (or lowered) from the superstructure 1706. The superstructure 1706 has a race 1708 that extends from a first end 1710 central to the solar power canopy 1602 to an edge 1712 distal from the first end and proximal the window 1704. The battery compartment 120 has an extension surface 1714 (FIG. 17). The winch raises the battery compartment 120 into the window 1704. The motorized winch 1700 travels along the track 1702 until the battery compartment 120 is positioned along the race 1708. The battery compartment may be lowered by the winch 1700 until the extension surface 1714 engages the race 1708 and/or the first and second mechanisms are coupled. As shown in FIG. 17B, the winch 1700 may couple to an outer track 1716 such that the winch may move between superstructures 1706. Also, the cable 1604 may have a connector 1718 to facilitate coupling to the battery compartment 120, such as, for example, the connector plate shown. The extension surface 1714 also may have rollers 1720 to facilitate movement of the battery compartment 120 along, for example, the race 1708. The winch 1700 slidable along the outer track 1716 may be used with a second winch (similar to the winch 1700) or a pulley (similar to the second pulley 1612).

Figure 18:
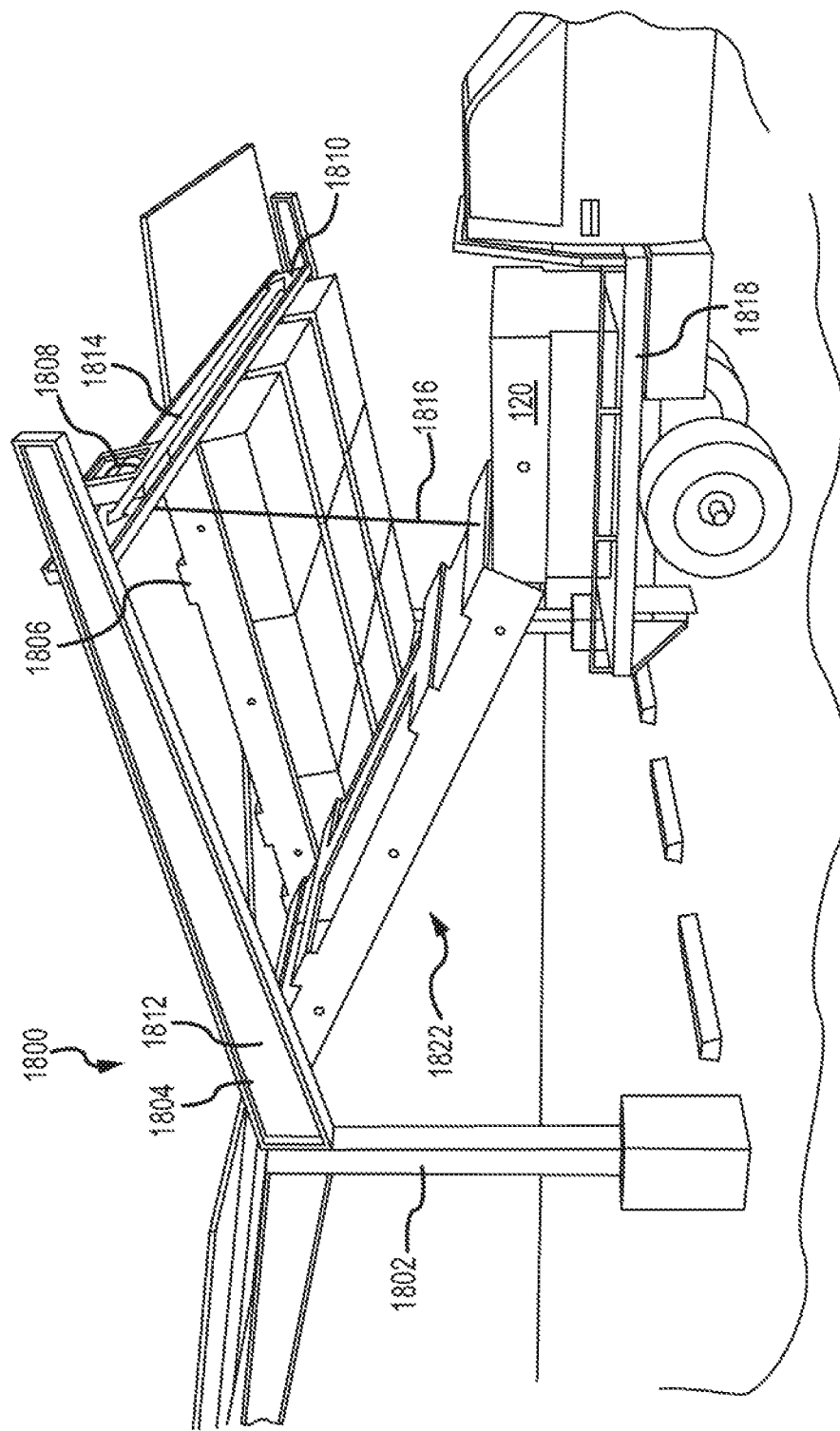
FIGS. 18 and 18A show a solar power canopy with a plurality of battery compartments consistent with the technology of the present application.
Figure 18A:
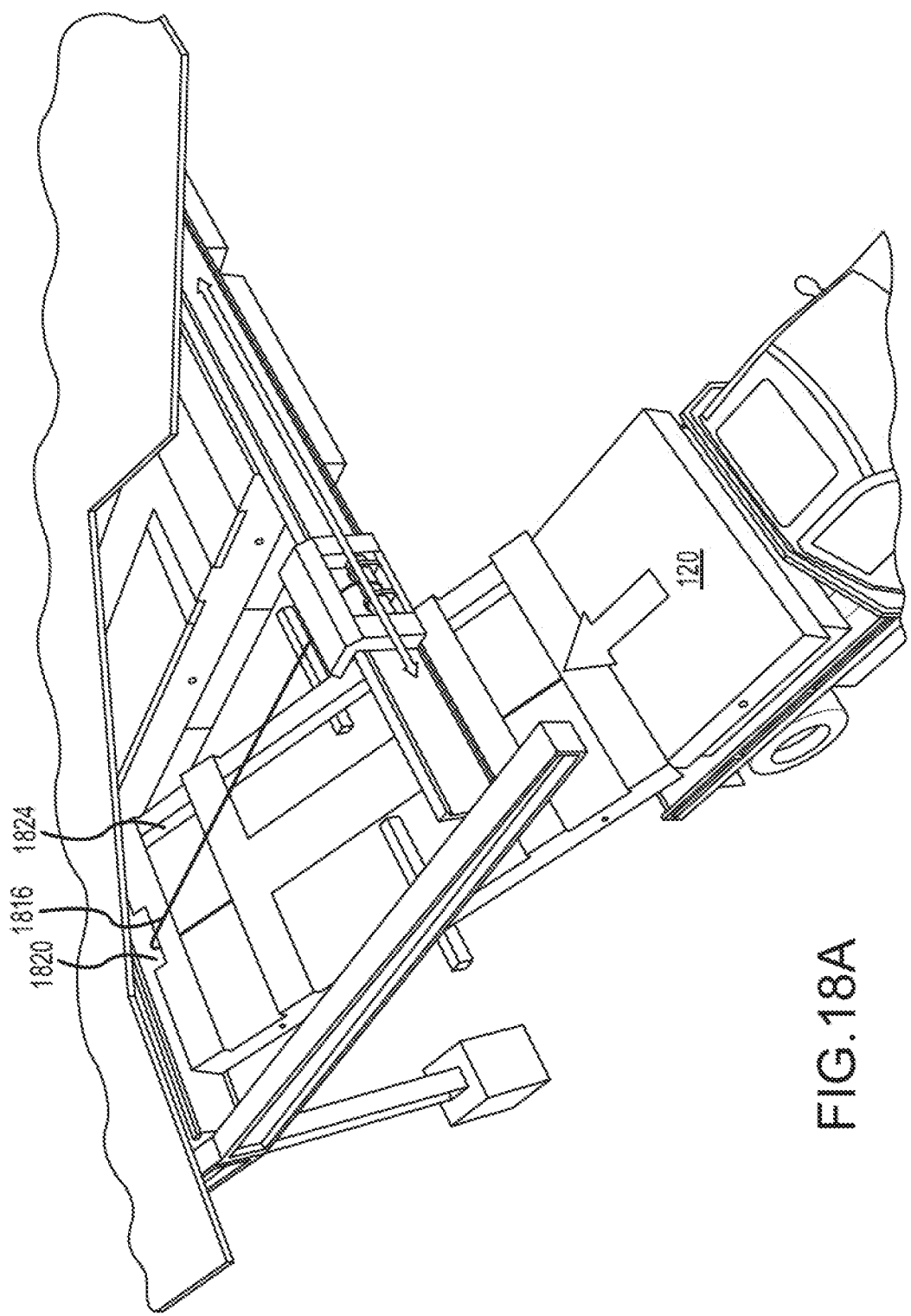

FIG. 18 shows an alternative solar power canopy 1800 consistent with the technology of the present application. The solar power canopy 1800 has a vertical support 1802 and a horizontally extending support 1804. A superstructure 1806 is coupled to the solar power canopy 1800. The superstructure 1806 is sized to generally fit one or more battery compartments 120, such as the three (3) compartments shown in the exemplary figure. A motorized winch 1808 (which could alternatively be a hand crank in certain embodiments) is connectable to the solar power canopy 1800, such as along an outer edge track 1810. The superstructure 1806 is pivotally coupled, such as by an axle or hinge, to the solar power canopy 1800 at a first end 1812 and releasably coupled, such by a latch or lock, to the solar power canopy 1800 at a second end 1814. The pivot is shown towards the center but the first and second ends could be swapped as desired. A cable 1816 is releasably coupled between the winch 1808 and the superstructure 1806 at the second end 1814. The superstructure is released from the solar canopy and pivoted from a closed (engaged) configuration to an open (load/unload) configuration. A flat surface 1818, such as a flatbed truck, is aligned with the second end 1814 of the superstructure 1806 in the open configuration. The flat surface 1818 may support the second end 1814 such that the cable 1816 can be removed from the superstructure and coupled to the battery compartment 120. The cable 1816 (or a second cable) is run from the winch 1808 to a cable track 1820, which is shown located at the first end 1812 of the superstructure 1806. The cable is run through the interior 1822 of the superstructure 1806 and coupled to the battery compartment 120. The winch 1808 operates to slide the battery compartment along the superstructure rails 1824 until the battery compartment 120 is in place, such that the first and second mechanisms can be coupled to hold the battery compartment 120 in place. Subsequently, the cable is removed and another battery compartment may be loaded. Once all the battery compartments 120 are loaded, the cable 1816 is removed from the battery compartments and coupled to the second end 1814 of the superstructure 1806. The winch 1808 is operated to pivot the superstructure to the closed configuration such that the superstructure is coupled to the solar canopy, such as by the latch or lock. The process to unload the battery compartment is similar but the cable is attached to the battery compartment prior to decoupling the first and second mechanisms and the winch is operated to lower the battery to the support surface.

FIG. 19 shows still another configuration of a solar power canopy. Solar power canopy 1900 has vertical supports 1902 and horizontal supports 1904. The solar power canopy 1900 also has central beam 1906 and outer beam 1908 extending a length of the solar power canopy 1900 from vertical support 1902 to vertical support 1902 on opposite ends of the solar power canopy 1900. A superstructure 1910 is releasably coupled to the solar power canopy 1900, such as by a bolted coupling. The superstructure 1910 is releasably coupled to one cable 1912 or a plurality of cables 1912. The cable 1912 is coupled to a motorized winch or hoist 1914. The superstructure 1910 is decoupled from the solar power canopy 1900 and raised or lowered by operation of the winch or hoist 1914. The superstructure 1910 is, as shown in the example, lowered onto a bank 1915 of battery compartments 120. The battery compartments 120 are coupled to the superstructure 1910, and the superstructure 1910 is raised until the superstructure 1910 is recoupled to the solar power canopy 1900.

Figure 20:
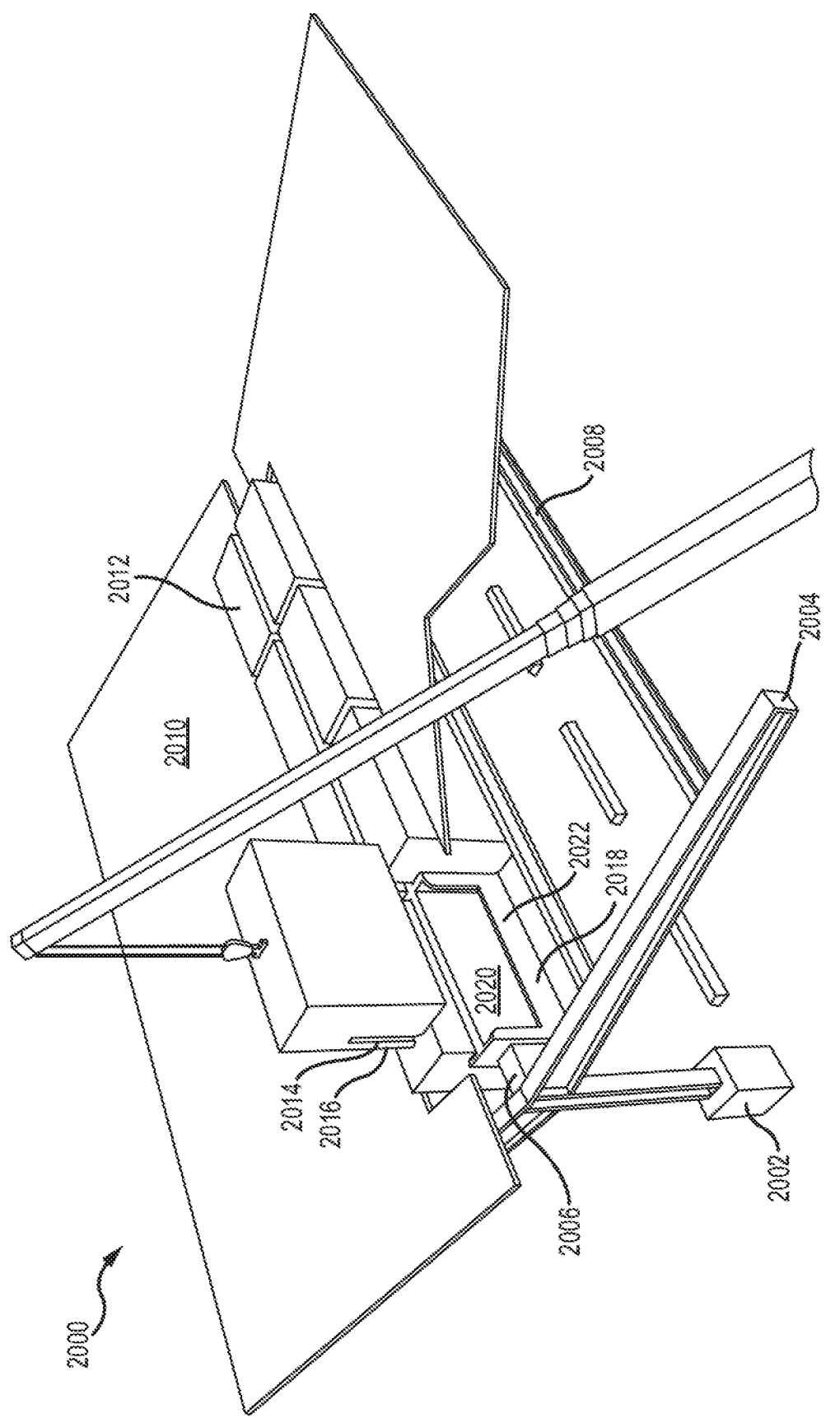
FIGS. 20 and 20A show a solar power canopy with a plurality of battery compartments consistent with the technology of the present application.

FIG. 20 shows another solar power canopy 2000. Solar power canopy 2000 includes, as shown in the exemplary embodiment, a plurality of vertical supports 2002 and a plurality of horizontally extending struts 2004. A first beam 2006 extends between the vertical supports 2002 and a plurality of second beams 2008 extend between the horizontal struts 2004 to provide structural integrity as required. A plurality of solar panels 2010 are mechanically coupled to the horizontal struts 2004 and second beams, and electrically coupled to one or more battery compartments 2012. The solar panels 2010 form a gap G about the first beam 2006. The battery compartments 2012, in this exemplary embodiment, are formed with a vertically extending slot 2014 to define a flanged surface 2016 on battery compartment 2012. The first beam 2006 (which may be a plurality of beams 2006) holds dock unit 2018, that may saddle the first beam 2006 or be directly coupled such as by a weld, made integral with, a bolt, or the like. The dock unit 2018 may be exposed via the gap G in the solar panels 2010 above the first beam 2006. The dock unit 2018 form a cradle 2020 into which the flanged surface 2016 is fitted, such that the slot 2014 is fit over a wall 2022 of the cradle 2020. The battery compartment 2012 is moved into position by, for example, operation of a crane or the like.

Figure 20A:
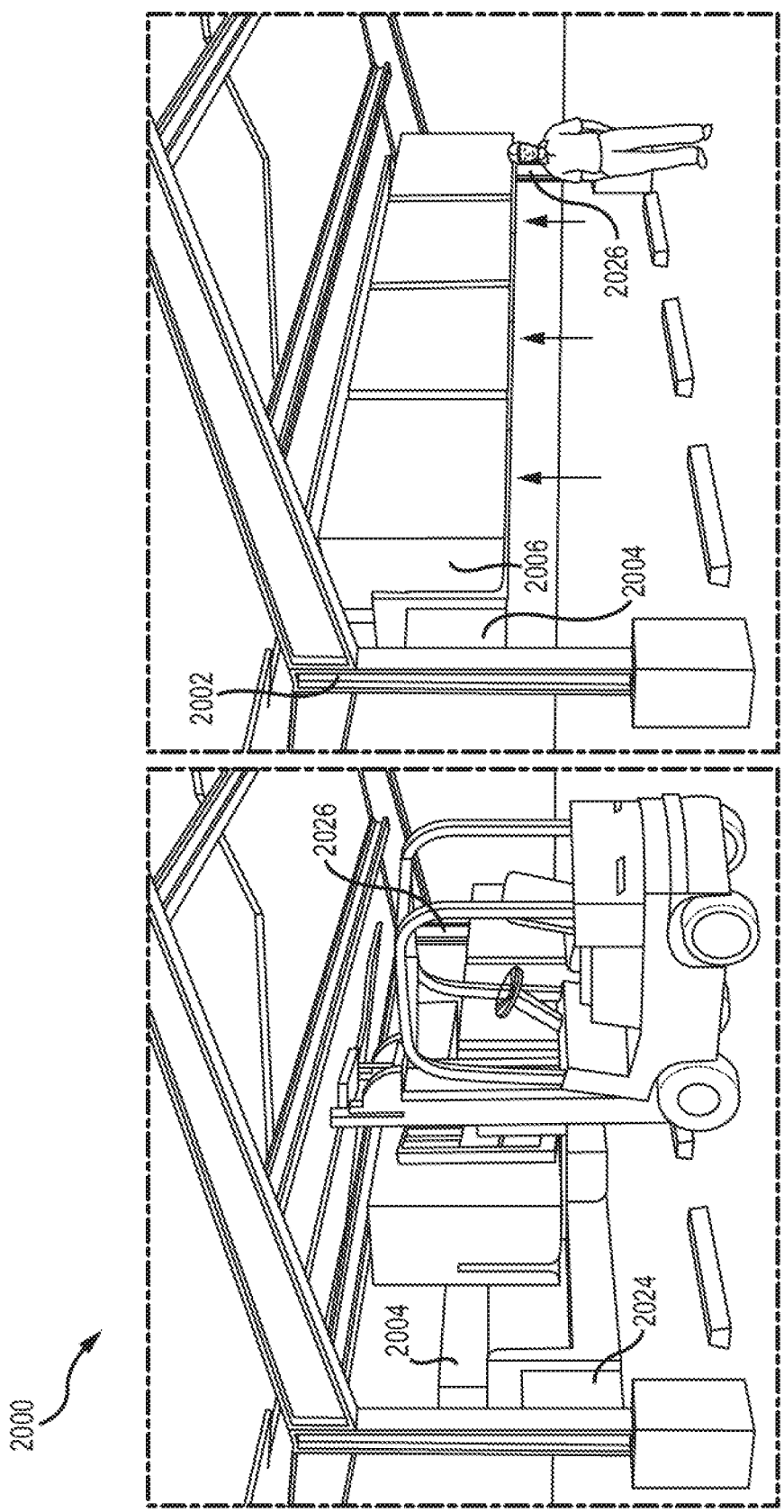

FIG. 20 shows loading the battery compartments 2012 using a crane to lower the battery compartment 2012 from a position over the solar power canopy 2000 into the dock unit 2018. FIG. 20A shows an alternative configuration of the solar power canopy 2000. The first beam 2006 extending between vertical supports 2002 is coupled to a lift mechanism 2024, such as a pylon jack, that may be moved by a hydraulic actuator, forklift, truck, winch, crank, or the like. The lift mechanism would travel in a vertical track 2026 in the vertical supports 2002 and have at least a bottom stop and a top stop that allows locking or retaining the first beam 2006 in a stationary location. The lowering of the first beam 2006 may allow for easier installation or removal of the battery compartments 2012.

Figure 21:
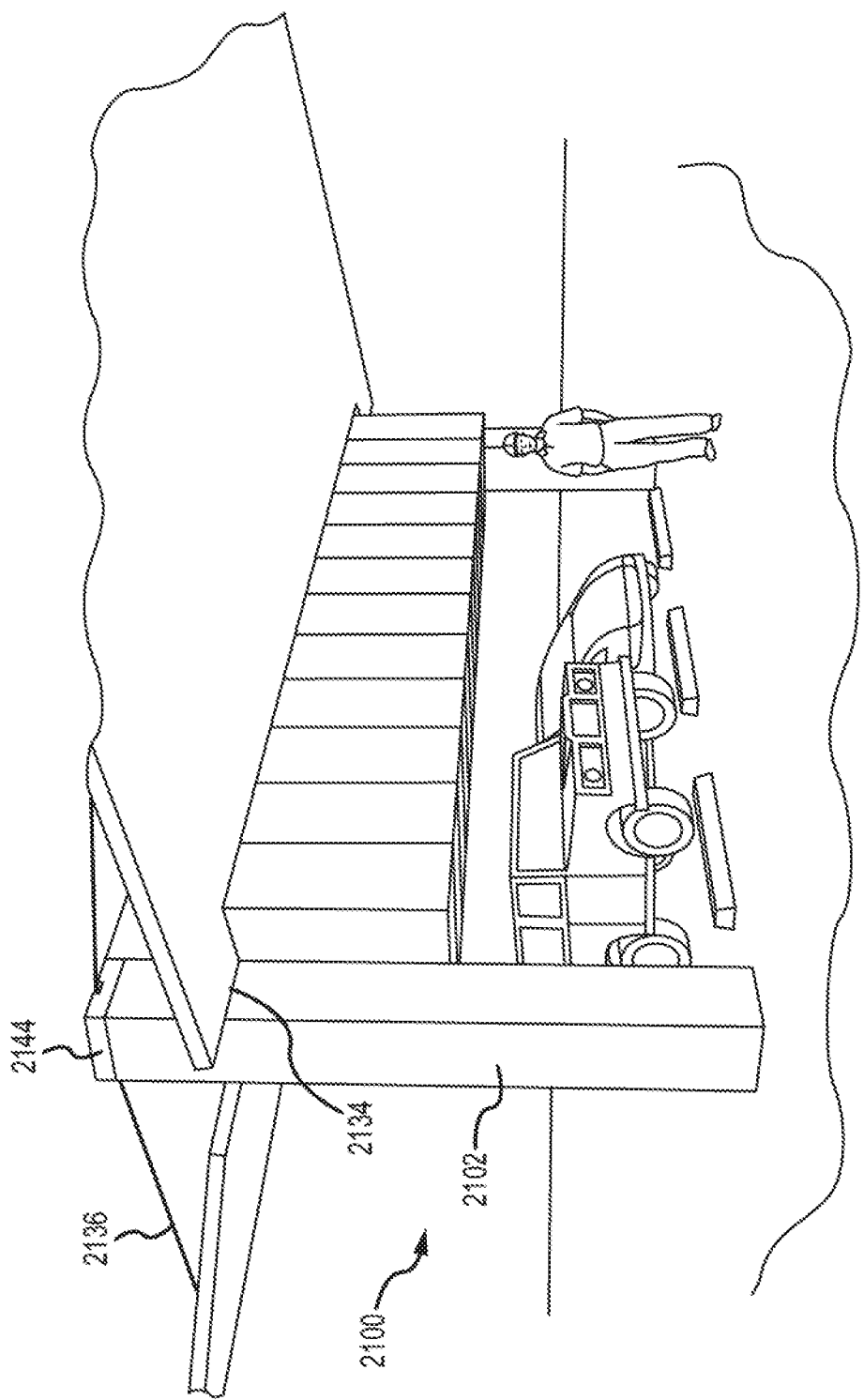
Figure 21A:
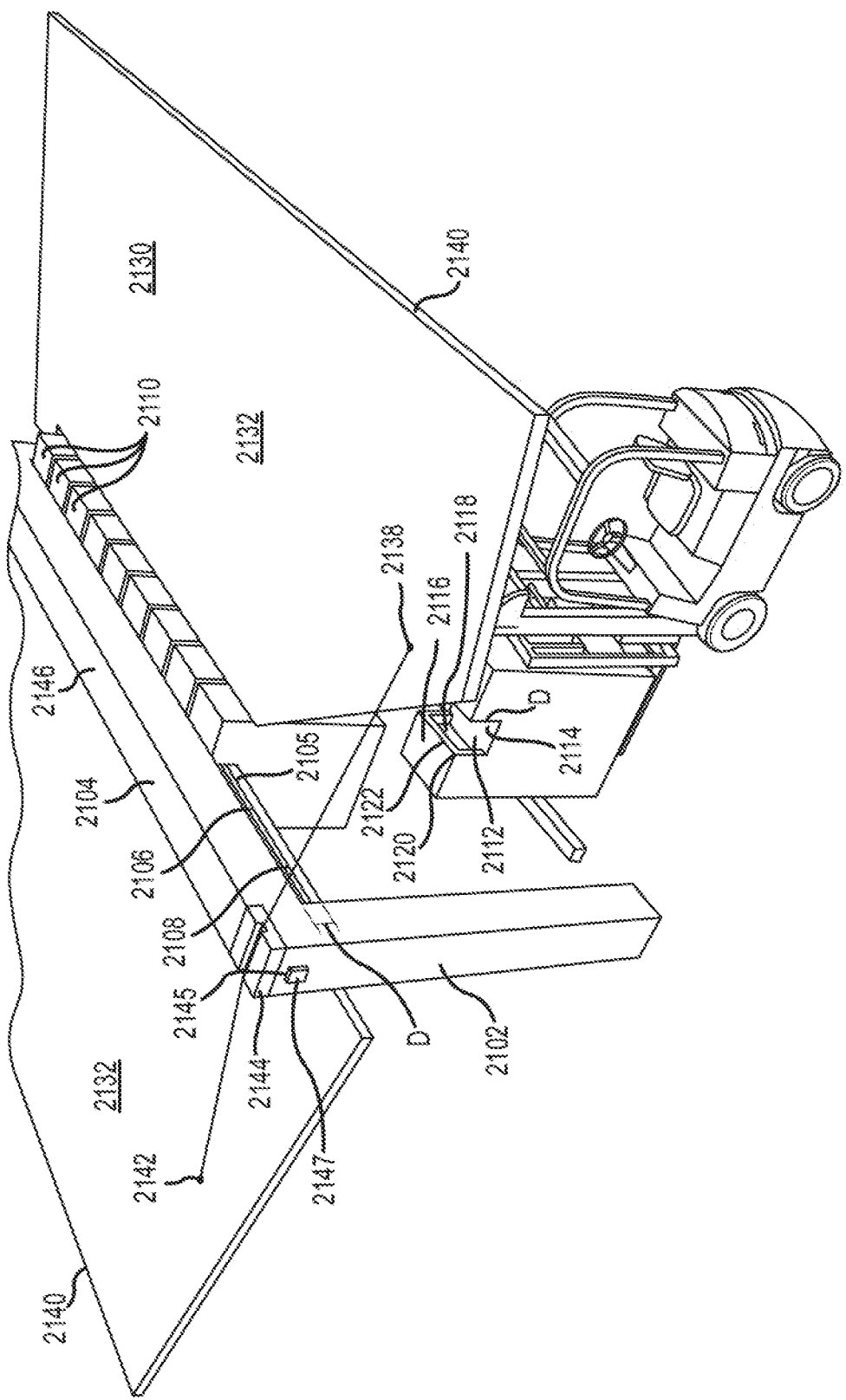
Figure 21B:
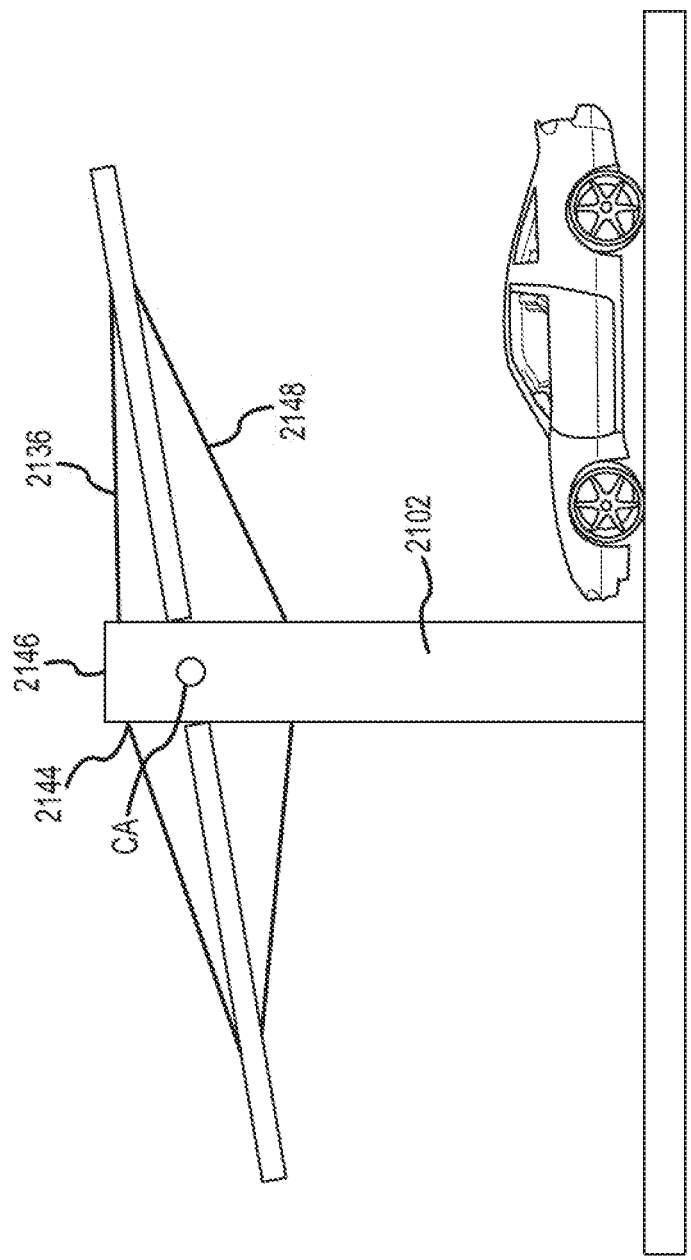

With reference now to FIGS. 21, 21A, and 21B, another embodiment of a solar power canopy 2100 is provided. Solar power canopy 2100, similar to the above canopies, has a vertical support 2102 and a first beam 2104 extending between the vertical supports. The first beam 2104 has a groove 2106 or notch milled into the lower portion 2108 of the first beam 2104 a distance D from the bottom surface 2105 of the first beam 2104. The battery compartments 2110, which are similar to the above mentioned battery compartments 120, have a recess 2112. The recess 2112 is defined by an inset top wall 2114 in the top wall 2116 and a pair of opposed sidewalls 2118. The top edge 2120 of the recess 2112 (where the top wall 2116 meets the pair of opposed sidewalls 2118) define an opposed pair of latches 2122. The inset top wall 2114 is set at least a distance D from the latches 2122 such that the lower portion 2108 of the first beam 2104 fits into the recess 2112. The latches 2122 are sized to engage the groove 2106 to couple the battery compartment 2110 to the first beam 2104. To load/unload the battery compartments 2110, the latches 2122 pivot (toward or away from the battery compartment) such that the latches 2122 hook into the grooves 2106 forming a snap lock.

Solar power canopy 2100 may have horizontal struts as explained above, however, the exemplary embodiment of solar power canopy 2100 has solar panels 2130 arranged in a pair of panel arrays 2132 coupled at first edges 2134 of the panel arrays 2132 to the first beam 2104. A cable 2136 extends from a first point 2138 on a first of the panel arrays 2132 that is located proximal the outer edge 2140 of the first of the panel arrays 2132 to a corresponding second point 2142 on a second of the panel arrays 2132 that is located proximal the outer edge 2140 of the second of the panel arrays 2132. The cable 2136 routes through a cable guide 2144 located on the top surface 2146 of the first beam 2104.

While the pair of panel arrays 2132 are counter balanced, horizontal support members (not shown) may be provided. As shown in FIG. 21B, the solar power canopy 2100 may have upper tension cables 2136 and lower tension cables 2148.

In certain embodiments, the pair of panel arrays 2132 may be hinged or pivotally mounted (rather than mounted at a fixed angle) to the first beam 2104 at the first edges. The cable guide 2144 may be provided with a cable grip 2145 and a motor 2147. The motor 2147 may be operated to move the cable grip 2145. The cable grip 2145 moves the cable 2136 in either direction. Movement of the cable 2136 causes the pair of panel arrays 2132 to rotate up or down. This may allow positioning the pair of panel arrays 2132 in a more optimal position for exposure to the sun. Alternatively, the pair of panel arrays 2132 may be coupled at a central axle CA at the first edges 2134 rather than hinged or pivotally mounted to the first beam 2104. The central axle may extend between the vertical support member 2102 (and may be in the first beam 2104). The motor, in this case, may cause the axle to rotate the panels similar to the rotation described above. The rotation of the pair of panel arrays 2132 will cause the cable 2136 to move within the cable guide 2144. In certain embodiments, the panel arrays 2132 may be coupled to a central axle CA and the cable guide 2144 may have a cable grip 2145 such that one or more motors 2147 may cause movement of both the cable grip 2145 and the central axle CA.

Figure 21C:
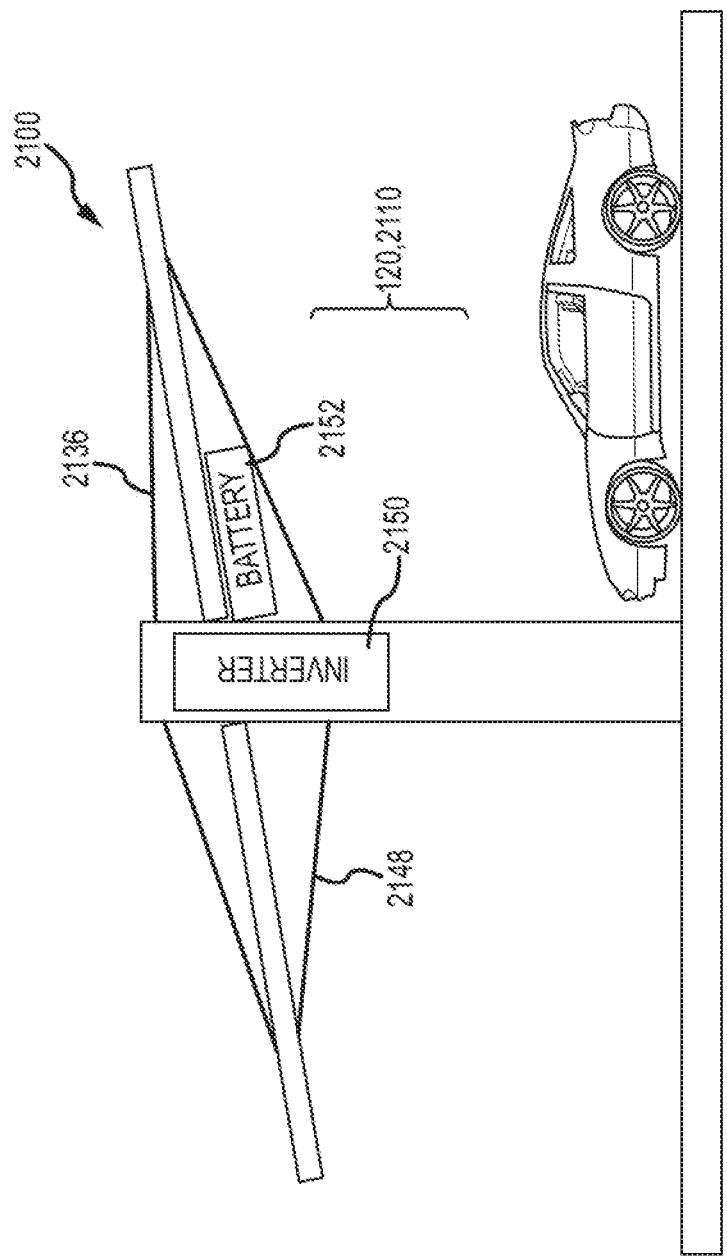
Figure 21D:
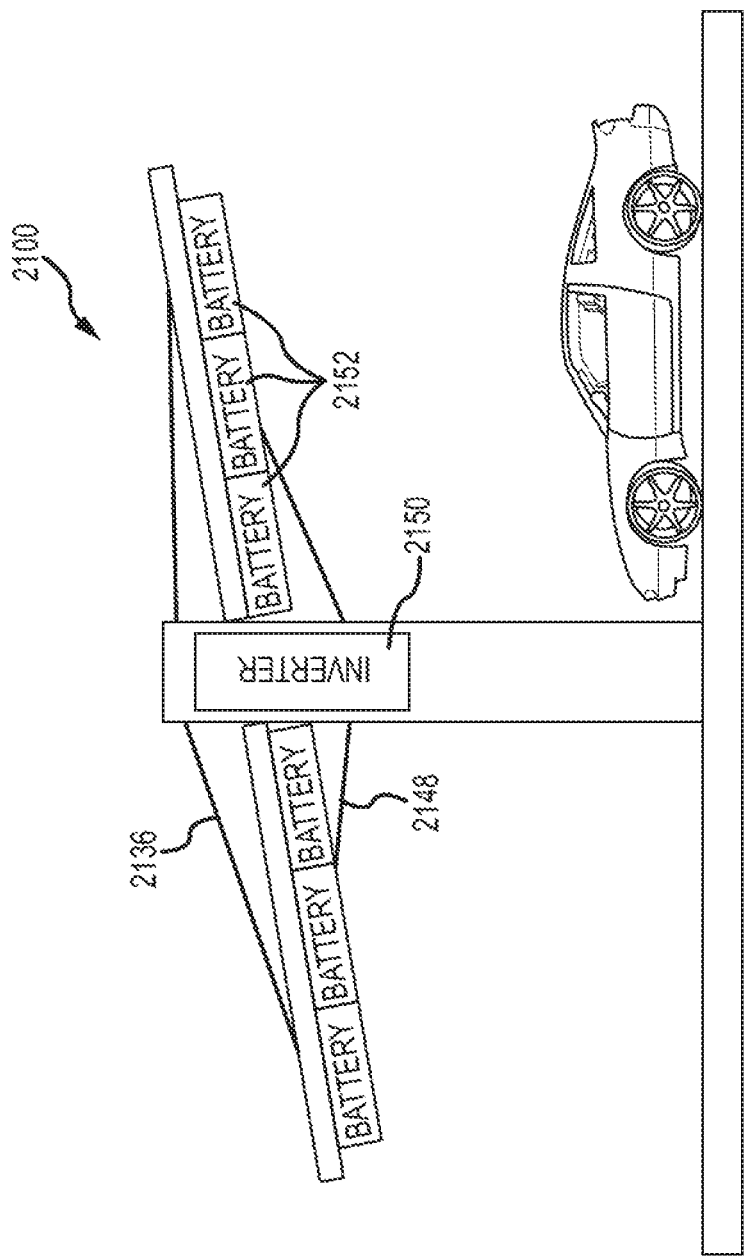

In the above descriptions, the battery compartment is generically referred to as a box like structure containing the electronics for a high capacity storage unit (such as a battery capable of storing between about 10 kWatt/Hours to 250 kWatt/Hours or more electrical energy), inverters, and PC controls to couple the DC storage unit to a power grid (local or regional). With reference to FIG. 21C, however, the solar power canopy 2100 with upper and lower tension cables 2136 and 2148 is shown with a specific inverter box 2150 and a specific battery storage box 2152. Together, the inverter box 2150 (which would likely house the PC controls as well) with the storage box 2152 (which would likely house the high capacity storage unit/battery along with coolant systems) would form the battery compartment as referenced throughout the application. As can now be appreciated, the battery compartments described herein may be single units or split into multiple units such that some of the battery compartments may only include inverters; some may only include controllers; and some may only include storage units; and some may include combinations of the above. As shown in FIG. 21D, the storage box 2152 may be placed in manners as described above such that the storage boxes 2152 are arranged under the panel arrays 2132 as described in some embodiments above. The storage boxes 2152 also may be stacked (not shown). As can be appreciated, the storage boxes 2152 (similar to the other battery compartments) would be arranged to evenly distribute weight.

FIGS. 22 and 22A show an alternative construction of solar power canopy 2100. The solar power canopy 2100 includes a double row of battery compartments 2200 such that a support connector plate 2202 is coupled to the bottom surface 2105 of the first beam 2104. The bottom surface 2105 has a plurality of connectors 2204 that have a first mechanism 2206 that is engageable with a second mechanism 2208 on the battery compartments 2200. In this particular exemplary embodiment, the connectors 2204 have male protrusions 2210 that can snap into corresponding female sockets 2212 on the battery compartments 2200. As can be best seen in the exploded portion of FIG. 22, the connectors 2204 may have electrical connections 2214 that mate with electrical connections 2216 on the battery compartments 2200 as best seen in FIG. 22A. Blind electrical connections, as described here, may be provided for all the above referenced embodiments and configurations.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A canopy comprising:
   a plurality of vertical support members;
   at least a first beam coupling at least two of the plurality of vertical support members;
   a plurality of horizontal support members coupled to and extending from at least one of the plurality of vertical support members and the first beam;
   at least one superstructure movably coupled to at least one of the plurality of vertical support members, the first beam, and the plurality of horizontal support members; the superstructure configured to move between an engaged configuration and a load/unload configuration; and
   at least one high capacity storage unit releasably, operably coupled to the at least one superstructure, the at least one high capacity storage unit comprising at least one of a battery capable of storing at least 10 kWatt/Hours, an inverter, or a combination thereon,
   wherein the at least one high capacity storage unit is sized to be loaded/unloaded into the at least one superstructure when the at least one superstructure is in the load/unload configuration and the at least one high capacity storage unit is configured to operable couple to at least one of a local power network, a grid power network, or a combination thereof when the at least one superstructure is in the engaged configuration.

2. The canopy of claim 1 wherein the at least one high capacity storage unit comprises at least a battery storage box.

3. The canopy of claim 2 wherein the at least one high capacity storage unit comprises at least an inverter box.

4. The canopy of claim 3 wherein the inverter box is coupled to at least one of the plurality of vertical support members and the first beam and the battery storage box is coupled to at least one of the plurality of horizontal support members.

5. The canopy of claim 3 wherein the battery storage box is electrically coupled to the inverter box when the superstructure is in the engaged position.

6. The canopy of claim 1 wherein the superstructure pivotally coupled to at least one of the plurality of vertical support members, the first beam, and the plurality of horizontal support members.

7. The canopy of claim 1 wherein the superstructure is movable between the engaged configuration, a non-engaged configuration, and the load/unload configuration.

8. The canopy of claim 1 wherein the superstructure comprises at least one of rails and tracks and the high capacity storage unit comprises a flanged surface such that the high capacity storage unit may slide along the rails or tracks.

9. The canopy of claim 8 wherein the flanged surface comprises at least one of a wheel and roller.

10. The canopy of claim 1 comprising a plurality of solar panels.

11. A canopy comprising:
    a plurality of vertical support members;
    at least a first beam coupling at least two of the plurality of vertical support members;
    a plurality of horizontal support members coupled to and extending from at least one of the plurality of vertical support members and the first beam; and
    at least one high capacity storage unit releasably, operably coupled to the first beam, the at least one high capacity storage unit comprising at least one of a battery capable of storing at least 10 kWatt/Hours, an inverter, or a combination thereon.

12. The canopy of claim 11 comprising a plurality of solar panels configured to be operatively coupled to the at least one high capacity storage unit.

13. The canopy of claim 11 wherein the at least one high capacity storage unit comprises at least one inverter box.

14. The canopy of claim 13 wherein the at least one high capacity storage unit comprises at least one battery box separate from the at least one inverter box.

15. The canopy of claim 14 wherein the at least one inverter box is coupled to the first beam and the at least one battery box is coupled to at least one of the plurality of horizontal support members.

16. The canopy of claim 15 wherein the inverter box is fixedly coupled to the first beam and the at least one battery box is removably coupled to at least one of the plurality of horizontal support members.

* * * * *